(12) United States Patent
Berkey et al.

(10) Patent No.: US 6,611,647 B2
(45) Date of Patent: Aug. 26, 2003

(54) LARGE EFFECTIVE AREA OPTICAL FIBER

(75) Inventors: George E. Berkey, Pine City, NY (US); Daiping Ma, Wilmington, NC (US); Snigdharaj K. Mishra, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/996,632

(22) Filed: Nov. 28, 2001

(65) Prior Publication Data

US 2003/0086667 A1 May 8, 2003

Related U.S. Application Data

(60) Provisional application No. 60/276,350, filed on Mar. 16, 2001, and provisional application No. 60/254,909, filed on Dec. 12, 2000.

(51) Int. Cl.[7] ............................................. G02B 6/16
(52) U.S. Cl. ................................... 385/123; 65/385
(58) Field of Search ................. 385/123, 124, 385/140, 141, 142, 143, 126; 65/377, 381, 385, 398, 410, 411, 435, 399

(56) References Cited

U.S. PATENT DOCUMENTS

| | | | | |
|---|---|---|---|---|
| 4,629,485 A | * | 12/1986 | Berkey | 65/398 |
| 5,509,101 A | * | 4/1996 | Gilliland et al. | 385/123 |
| 5,715,346 A | | 2/1998 | Liu | 385/124 |
| 5,781,684 A | | 7/1998 | Liu | 385/124 |
| 6,321,016 B1 | | 11/2001 | Tirloni et al. | 385/127 |
| 6,337,942 B1 | | 1/2002 | Kato et al. | 385/127 |
| 2001/0017967 A1 | | 8/2001 | Hirano et al. | 385/123 |
| 2001/0021298 A1 | | 9/2001 | Mukasa | 385/124 |
| 2002/0012509 A1 | | 1/2002 | Mukasa | 385/123 |
| 2002/0018631 A1 | | 2/2002 | Arai et al. | 385/127 |
| 2002/0154876 A1 | | 10/2002 | Kawasaki et al. | 385/124 |

FOREIGN PATENT DOCUMENTS

| | | | |
|---|---|---|---|
| EP | 0965866 | 12/1999 | G02B/6/22 |
| EP | 0992817 | 4/2000 | G02B/6/16 |
| EP | 1030199 | 8/2000 | G02B/6/16 |
| EP | 1030200 | 8/2000 | G02B/6/22 |
| EP | 1030474 | 8/2000 | H04B/10/18 |
| EP | 1076250 | 2/2001 | G02B/6/22 |
| EP | 1107027 | 6/2001 | G02B/6/16 |
| EP | 1120671 | 8/2001 | G02B/6/22 |
| EP | 1124145 | 8/2001 | G02B/6/16 |
| EP | 1130426 | 9/2001 | G02B/6/16 |
| EP | 1154294 | 11/2001 | G02B/6/16 |
| EP | 1160595 | 12/2001 | G02B/6/16 |
| WO | WO99/32410 | 7/1999 | C03B/8/04 |
| WO | WO00/17681 | 3/2000 | G02B/6/16 |
| WO | WO00/36443 | 6/2000 | G02B/6/16 |
| WO | WO00/64824 | 11/2000 | C03B/37/00 |
| WO | WO02/16970 | 2/2002 | |
| WO | WO01/27667 | 4/2002 | G02B/6/00 |

OTHER PUBLICATIONS

Liu et al, "Single–Mode Dispersion–Shifted Fibers with Effective Area Over 100 $\mu m^2$", ECOC '98, Sep. 20–24, 1998, Madrid, Spain, pp. 41–42.

(List continued on next page.)

Primary Examiner—Akm E. Ullah
(74) Attorney, Agent, or Firm—Joseph M. Homa

(57) ABSTRACT

An optical waveguide fiber having a relatively large effective area which exhibits low attenuation, low PMD and low microbending sensitivity. A step-index refractive index profile is advantageously used.

67 Claims, 8 Drawing Sheets

OTHER PUBLICATIONS

Himeno et al, "Splice Loss of Large Effective Area Fiber and Its Reduction by Mode Field Conversion", ECOC '97, Sep. 22–25, 1997, Conference Publication No. 448, pp. 131–134.

Nouchi et al, "New Dispersion Shifted Fiber with Effective Area Larger Than 90 $\mu m^2$", $22^{nd}$ European Conference on Optical Communication—ECOC '96, Oslo, pp. 1.49–1.52 (No month available).

da Silva, "A new design for dispersion–shifted fiber with an effective core area larger than 100 $\mu m^2$ and good bending characteristics", OFC '98 Technical Digest, pp. 301–302 (No month available).

Nouchi, "Maximum effective area for non–zero dispersion–shifted fiber", OFC '98 Technical Digest, pp. 303–304 (No month available).

Yin et al. "A new design for non–zero dispersion–shifted fiber (NZ–DSF) with a large effective area over 100 $\mu m^2$ and low bending and splice loss", Optics Communications 177 (2000), pp. 225–232 (Apr. 15, 2000).

\* cited by examiner

LARGE EFFECTIVE AREA OPTICAL FIBER

RELATED APPLICATIONS

This application claims the benefit of the priority date of commonly assigned U.S. Provisional Patent Application Nos. 60/254,909 filed Dec. 12, 2000 and 60/276,350 filed Mar. 16, 2001.

BACKGROUND OF THE INVENTION

1. Field of the Invention

A single mode optical waveguide fiber for use in telecommunication systems and more particularly, a waveguide fiber which reduces non-linear dispersion effects, combines bend resistance, low polarization mode dispersion (PMD), low attenuation, and large effective area features desired, for example, in underground and undersea applications is disclosed herein.

2. Technical Background

Optical amplifier technology and wavelength division multiplexing techniques are typically required in telecommunication systems that require high power transmissions for long distances. Undesirable non-linear effects become more pronounced for higher powers and/or longer distances. The definition of high power and long distances is most meaningful in the context of a particular telecommunication system wherein a bit rate, a bit error rate, a multiplexing scheme, and perhaps optical amplifiers are specified. Additional actors, known to those skilled in the art, have impacted upon the definition of high power and long distance. However, for most purposes, high power could be considered to be an optical power greater than about 10 mW. In some applications, single power levels of 1 mW or less are still sensitive to non-linear effects, so that the effective area is still an important consideration in such lower power systems. A long distance could be considered to be an application in which the distance between optical regenerators or repeaters or amplifiers is in excess of 50 km or more. Regenerators are to be distinguished from repeaters that make use of optical amplifiers. Repeater spacing, especially in high data density systems, can be less than half the regenerator spacing. To provide a suitable waveguide for a multiplex transmission, the total dispersion should be low, but not zero, and have a low dispersion slope over the window of operating wavelength.

Generally, an optical waveguide fiber having a large effective area ($A_{eff}$) reduces non-linear optical effects, including self-phase modulation, four-wave-mixing, cross-phase modulation, and non-linear scattering processes, all of which can cause degradation of signals in high powered systems. In general, a waveguide fiber having a segmented core can provide a large effective area while limiting the non-linear optical effects.

The mathematical description of these non-linear effects includes the ratio, $P/A_{eff}$, where P is the optical power. For example, a non-linear optical effect can be described by an equation containing the term, $\exp[P \times L_{eff}/A_{eff}]$, where $L_{eff}$ is effective length. Thus, an increase in $A_{eff}$ produces a decrease in the non-linear contribution to the degradation of a light signal. On the other hand, an increase in effective area of an optical waveguide fiber typically results in an increase in microbending induced losses which attenuate signal transmission through a fiber. The microbending losses become increasingly significant over long distances or spacing between regenerators, amplifiers, transmitters and/or receivers.

Optical amplifier technology and/or wavelength division multiplexing techniques are typically employed in communication systems which require one gigabyte per second and higher transmission rates. Thus waveguide fiber manufacturers have designed waveguides that are less susceptible to non-linear effects induced by higher power signals or by four wave mixing in multiplexing systems. Preferred waveguide fibers have low linear dispersion and low attenuation as well. Furthermore, fiber polarization mode dispersion (PMD) may be a major contributor to overall system PMD. Therefore, a suitable waveguide fiber should also have low PMD. Lower fiber PMD can also provide upgrade paths for high bit rate transmission (e.g. 40 Gbs and higher) in existing or upgraded systems. In addition, the waveguide fiber preferably displays these properties over a particular extended wavelength range in order to accommodate wavelength division multiplexing used for multiple channel transmission.

SUMMARY OF THE INVENTION

One aspect of the optical waveguide fiber disclosed herein relates to a relatively large effective area single mode optical waveguide fiber that offers low microbending sensitivity. The fibers disclosed herein preferably include a single segment core. The core region is described by a refractive index profile, a relative refractive index percent, and an outer radius. The optical waveguide fiber further includes a clad layer surrounding and in contact with the core. Unless indicated otherwise, the effective area described herein corresponds to a wavelength of about 1550 nmn.

Preferably, the effective area of the fibers disclosed herein is greater than or equal to about 90 $\mu m^2$, and exhibits microbending of less than or equal to about 3.0 dB/m, more preferably less than or equal to about 2.0 dB/m, even more preferably less than or equal to about 1.5 dB/m, even still more preferably less than or equal to about 1.0 dB/m, yet still more preferably less than or equal to about 0.8 dB/m, and even still more preferably less than or equal to about 0.5 dB/m.

The core region and cladding layer preferably define a step-index refractive index profile. Preferably, the fibers disclosed herein has a maximum relative index $\Delta_1\%$ of between about 0.20% and about 0.35%, more preferably between about 0.24% and about 0.33%, even more preferably between about 0.26% and about 0.32%, and still more preferably between about 0.27% and about 0.31%. Preferably, the core radius of the fibers disclosed herein, measured at half the maximum or peak relative index, is between about 4.0 $\mu$m and about 7.0 $\mu$m, more preferably between about 4.5 $\mu$m and about 6.5 $\mu$m, and still more preferably is between about 5.0 $\mu$m and about 6.2 $\mu$m.

The fibers disclosed herein further preferably comprise a primary coating surrounding the cladding and a secondary coating, also known as an outer primary coating, surrounding the primary coating. The primary coating is preferably selected to have a modulus of elasticity of less than about 5 MPa, more preferably less than about 3 MPa, and even more preferably less than about 1.5 MPa. Preferably, the modulus of elasticity of the secondary coating is greater than 700 Mpa, more preferably greater than 800 Mpa, and even more preferably over 900 MPa.

Preferably, the fibers disclosed herein comprise a core region of silica which is up-doped with germania, and a cladding of silica. Preferably, the cladding contains no down-dopants. Even more preferably, the cladding contains no fluorine. Most preferably, the cladding comprises pure or substantially pure silica.

In another aspect, the optical waveguide fiber disclosed herein relates to a relatively large effective area single mode optical waveguide fiber having a step-index profile. Preferably, the effective area of the fibers disclosed herein is greater than or equal to about 90 $\mu m^2$. In one or more preferred embodiments, the effective area is between about 90 $\mu m^2$ and about 115 $\mu m^2$, more preferably between about 95 $\mu m^2$ and about 110 $\mu m^2$.

Preferably, the fibers disclosed herein have a maximum relative index $\Delta_1\%$ of between about 0.20% and about 0.35%, more preferably between about 0.24% and about 0.33%, still more preferably between about 0.26% and about 0.32%, and yet more preferably between about 0.27% and about 0.31%. Preferably, the core radius of the fibers disclosed herein, measured at half the maximum or peak relative index, is between about 4.0 $\mu m$ and about 7.0 $\mu m$, more preferably between about 4.5 $\mu m$ and about 6.5 $\mu m$, even more preferably between about 5.0 $\mu m$ and about 6.2 $\mu m$.

Preferably, the fibers disclosed herein comprise a core region of silica which is up-doped with germania, and a cladding of silica. Preferably, the cladding contains no down-dopants. Even more preferably, the cladding contains no fluorine. Most preferably, the cladding comprises pure, or substantially pure, silica.

The fibers disclosed herein preferably exhibit an attenuation at a wavelength of about 1550 nm of less than or equal to about 0.25 dB/km, more preferably less than or equal to about 0.22 dB/km, even more preferably less than or equal to about 0.2 dB/km, yet more preferably less than or equal to about 0.19 dB/kyn, and most preferably less than about 0.185 dB/km.

In preferred embodiments, the fibers disclosed herein exhibit a total dispersion at a wavelength of about 1560 nm of preferably within the range of about 16 ps/nm-km to about 22 ps/nm-km, more preferably within the range of about 17 ps/nm-km to about 21 ps/nm-km, and even more preferably within the range of about 18 ps/nm-km to about 20 ps/nm-km.

The total dispersion slope at a wavelength of about 1550 nm of the fibers disclosed herein is preferably less than or equal to about 0.09 ps/nm$^2$-km. In one or more preferred embodiments, the total dispersion slope at a wavelength of about 1550 nm of the fibers disclosed herein is preferably between about 0.045 ps/nm$^2$-km and about 0.075 ps/nm$^2$-km, even more preferably between about 0.05 ps/nm$^2$-km and about 0.07 ps/nm$^2$-km, still more preferably between about 0.055 ps/nm$^2$-km and about 0.065 ps/nm$^2$-km.

In yet another aspect, the optical waveguide fiber disclosed herein relates to a relatively large effective area single mode optical waveguide fiber having a maximum relative index $\Delta_1\%$ of between about 0.20% and about 0.35%, more preferably between about 0.24% and about 0.33%, even more preferably between about 0.26% and about 0.32%, and still more preferably between about 0.27% and about 0.31%. Preferably, the core radius of the fibers disclosed herein, measured at half the maximum or peak relative index, is between about 4.0 $\mu m$ and about 7.0 $\mu m$, more preferably between about 4.5 $\mu m$ and about 6.5 $\mu m$, and still more preferably between about 5.0 $\mu m$ and about 6.2 $\mu m$.

Preferably, the refractive index profile of the fibers disclosed herein is of the step-index type. Preferably, the fibers disclosed herein comprise a core region of silica which is up-doped with germania, and a cladding of silica. Preferably, the cladding contains no down-dopants. Even more preferably, the cladding contains no fluorine. Most preferably, the cladding comprises pure, or substantially pure, silica.

In still another aspect, the optical waveguide fiber disclosed herein relates to a relatively large effective area single mode optical waveguide fiber which comprises an up-doped core region or which comprises a germano-silicate core region or which comprises a germania-doped silica core. Preferably, the fibers disclosed herein comprise a core region of silica which is up-doped with germania surrounded by a cladding of silica. Preferably, the cladding contains no down-dopants. Even more preferably, the cladding contains no fluorine. Most preferably, the cladding comprises pure, or substantially pure, silica. Preferably, the effective area is greater than or equal to about 90 $\mu m^2$.

In yet another aspect, the optical waveguide fiber disclosed herein relates to a relatively large effective area single mode optical waveguide fiber which exhibits low PMD. Preferably, the effective area is greater than or equal to about 90 $\mu m^2$. Preferably, the PMD exhibited by the fibers disclosed herein is less than about 0.1 ps/km$^{1/2}$ (unspun), more preferably less than about 0.08 ps/km$^{1/2}$ (unspun), even more preferably less than about 0.05 ps/km$^{1/2}$ (unspun), still more preferably less than about 0.03 ps/km$^{1/2}$ (unspun), even still more preferably less than about 0.02 ps/kr$^{1/2}$ (unspun). In one preferred embodiment, the optical waveguide fiber disclosed herein relates to a single mode optical waveguide fiber having an effective area greater than or equal to about 90 $\mu m^2$ and which a PMD of less than about 0.05 ps/km$^{1/2}$ (unspun). In another preferred embodiment, the optical waveguide fiber disclosed herein relates to a single mode optical waveguide fiber having an effective area greater than or equal to about 90 $\mu m^2$ and which a PMD of less than about 0.02 ps/km$^{1/2}$ (unspun).

Preferably, the fibers disclosed herein have a step-index profile, and further preferably comprises a core region of silica, which is up-doped with germania, the core region being surrounded by a cladding of silica. Preferably, the cladding contains no down-dopants. Even more preferably, the cladding contains no fluorine. Most preferably, the cladding comprises pure, or substantially pure, silica.

In another aspect, the optical waveguide fiber disclosed herein relates to an optical waveguide fiber comprising a core having a refractive index profile defined by a radius and a relative refractive index percent, wherein the core contains germania, and a clad layer surrounding and in contact with the core and having a refractive index profile defined by a radius and a relative refractive index percent, wherein the core and the clad layer provide an effective area greater than about 90 $\mu m^2$, and wherein the fiber contains substantially no fluorine. Preferably, the core and the clad layer provide an effective area of between about 90 $\mu m^2$ and about 115 $\mu m^2$, and more preferably the core and the clad layer provide an effective area of between about 95 $\mu m^2$ and about 110 $\mu m^2$. In a preferred embodiment, the core and the clad layer provide an effective area of about 101 $\mu m^2$. Preferably, the core and the cladding define a step-index profile. Preferably, the relative refractive index of the core is within the range of from about 0.20% to about 0.35%, more preferably the relative refractive index of the core is within the range of from about 0.24% to about 0.33%. Preferably, the radius of the core is within the range of from about 4.0 $\mu m$ to about 7.0 $\mu m$, more preferably the radius of the core is within the range of from about 4.5 $\mu m$ to about 6.5 $\mu m$. Preferably, the core has an alpha greater than about 5, and more preferably the core has an alpha between about 7 and about 14. Preferably, the fiber has a cabled cutoff wavelength of less than or equal to about 1500 nm, more preferably the fiber has a cabled cutoff wavelength of between about 1200 nm and about 1500 nm. In a preferred embodiment, the fiber has a cabled cutoff wavelength of between about 1250 nm and about 1400 nm. In another preferred embodiment, the fiber has a cabled cutoff wavelength of between about 1300 nm and about 1375 nm. Preferably, the fiber exhibits macrobending loss less than about 15 dB/m in a 20 mm, 5 turn test, more preferably less than about 10 dB/m in a 20 mm, 5 turn test, and even more preferably less than about 5 dB/m in a 20 mm, 5 turn test. The fiber preferably further comprises a primary coating surrounding the clad layer and a secondary coating surrounding the primary coating. The primary coating preferably has a modulus of elasticity of less than about 5 MPa. The secondary coating preferably has a modulus of elasticity of greater than about 700 MPa. Preferably, the fiber exhibits microbending loss of less than about 3.0 dB/m, more preferably less than about 2.0 dB/m, even more preferably less than about 1.5 dB/m, still more preferably less than about 1.0 dB/m, even still more preferably less than about 0.8 dB/m, and still more preferably less than about 0.5 dB/m. Preferably, the attenuation of the optical fiber at 1383 nm is not more than 0.1 dB/km higher than its attenuation at 1310 nm. More preferably, the attenuation of the optical fiber at 1383 nm is not more than 0.05 dB/km higher than its attenuation at 1310 nm. Still more preferably, the attenuation of the optical fiber at 1383 nm is not more than 0.01 dB/km higher than its attenuation at 1310 nm. Even still more preferably, the attenuation of the optical fiber at 1383 nm is less than or about equal to than its attenuation at 1310 nm. Preferably, the fiber exhibits a PMD of less than about 0.1 $ps/km^{1/2}$, more preferably less than about 0.05 $ps/km^{1/2}$, even more preferably less than about 0.01 $ps/km^{1/2}$, and still more preferably less than or equal to about 0.006 $ps/km^{1/2}$. Preferably, the fiber exhibits an attenuation at a wavelength of about 1550 nm of less than or equal to about 0.25 dB/km, more preferably less than or equal to about 0.22 dB/km, even more preferably less than or equal to about 0.2 dB/km, and still more preferably less than about 0.185 dB/km. Preferably, the fiber exhibits a total dispersion within the range of about 16 ps/nm-km to about 22 ps/nm-km at a wavelength of about 1560 nm.

In another aspect, the optical waveguide fiber disclosed herein relates to an optical waveguide fiber comprising a core having a refractive index profile defined by a radius and a relative refractive index percent with an alpha greater than about 5, wherein the core contains germania and wherein the relative refractive index of the core is within the range of about 0.20% to about 0.35% and the radius of the core is within the range of from about 4.0 μm to about 7.0 μm, and a clad layer surrounding and in contact with the core and having a refractive index profile defined by a radius and a relative refractive index percent, wherein the fiber contains substantially no fluorine. Preferably, the relative refractive index of the core is within the range of from about 0.24% to about 0.33%. Preferably, the radius of the core is within the range of from about 4.5 μm to about 6.5 μm. Preferably, the core has an alpha between about 7 and about 14. Preferably, the core and the cladding define a step-index profile. Preferably, the fiber further comprises a primary coating surrounding the clad layer, and a secondary coating surrounding the primary coating. The primary coating preferably has a modulus of elasticity of less than about 5 MPa. The secondary coating preferably has a modulus of elasticity of greater than about 700 MPa. Preferably, the attenuation of the optical fiber at 1383 nm is not more than 0.1 dB/km higher than its attenuation at 1310 nm. More preferably, the attenuation of the optical fiber at 1383 nm is not more than 0.05 dB/km higher than its attenuation at 1310 nm. Even more preferably, the attenuation of the optical fiber at 1383 nm is not more than 0.01 dB/km higher than its attenuation at 1310 nm. Still more preferably, the attenuation of the optical fiber at 1383 nm is less than or about equal to than its attenuation at 1310 nm. Preferably, the fiber exhibits a PMD of less than about 0.1 $ps/km^{1/2}$, more preferably less than about 0.05 $ps/km^{1/2}$, even more preferably less than about 0.01 $ps/km^{1/2}$, still more preferably even more preferably less than about 0.006 $ps/km^{1/2}$.

In another aspect, the optical waveguide fiber disclosed herein relates to an optical waveguide fiber comprising a core having a refractive index profile defined by a radius and a relative refractive index percent, wherein the core contains germania, and a clad layer surrounding and in contact with the core and having a refractive index profile defined by a radius and a relative refractive index percent, wherein the core and the clad layer provide an effective area greater than about 90 μm½, and wherein the fiber exhibits a PMD of less than about 0.1 $ps/km^{1/2}$.

In another aspect, the optical waveguide fiber disclosed herein relates to an optical waveguide fiber comprising a core having a refractive index profile defined by a radius and a relative refractive index percent, wherein the core contains germania and a clad layer surrounding and in contact with the core and having a refractive index profile defined by a radius and a relative refractive index percent, wherein the core and the clad layer provide an effective area greater than about 90 μm½, and wherein the attenuation of the optical fiber at 1383 nm is not more than 0.1 dB/km higher than its attenuation at 1310 nm.

In another aspect, an optical signal transmission system disclosed herein comprises a transmitter, a receiver, and an optical transmission line optically coupled to the transmitter and receiver, wherein the optical transmission line comprises at least one optical fiber section having a core and a clad layer which define a step-index profile that provides an effective area greater than about 90 $μm^2$, wherein the fiber exhibits an attenuation at 1383 nm which is not more than 0.1 dB/km higher than its attenuation at 1310 nm. The the core preferably contains germania. The fiber section preferably contains substantially no fluorine. Preferably, the fiber section exhibits a total dispersion within the range of about 16 ps/nm-km to about 22 ps/nm-km at a wavelength of about 1560 nm. Preferably, the fiber section exhibits a PMD of less than about 0.1 $ps/km^{1/2}$. In a preferred embodiment, at least one Raman amplifier is optically coupled to the optical fiber section. Preferably, the system further comprises a multiplexer for interconnecting a plurality of channels capable of carrying optical signals onto the optical transmission line, wherein at least one of the optical signals propagates at a wavelength between about 1300 nm and 1625 nm. In a preferred embodiment, at least one of the optical signals propagates at a wavelength between about 1330 nm and 1480 nm. Preferably, the system is capable of operating in a coarse wavelength division multiplex mode.

Reference will now be made in detail to the present preferred embodiments of the invention, examples of which are illustrated in the accompanying drawings.

DETAILED DESCRIPTION OF THE PREFERRED EMBODIMENT

Figure 1:
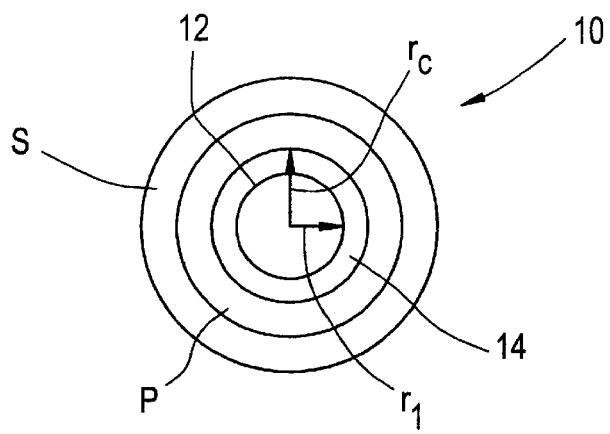
FIG. 1 is a schematic cross-sectional view of a preferred embodiment of an optical waveguide fiber in accordance with the present invention.

Additional features and advantages of the invention will be set forth in the detailed description which follows and will be apparent to those skilled in the art from the description or recognized by practicing the invention as described in the following description together with the claims and appended drawings.

Definitions

The following terminology and definitions are commonly used in the art.

The radii of the segments of the core are defined in terms of the index of refraction of the material of which the segment is made. A particular segment has a first and a last refractive index point. A central segment has an inner radius of zero because the first point of the segment is on the center line. In the case of step index, single segment index of refraction profiles, which are preferred herein, the index of refraction typically reaches a peak value and then falls as the radius increases. The outer radius of such central segment is the radius drawn from the waveguide center line to the one-half peak point of the refractive index of the central segment. For a segment having a first point away from the center line, the radius from the waveguide center line to the location of its first refractive index point is the inner radius of that segment. Likewise, the radius from the waveguide center line to the location of the one-half peak refractive index point of the segment is the outer radius of that segment. The segment radii may be conveniently defined in a number of ways. In this application, radii are defined in accord with the figures, described in detail below.

The effective area is generally defined as, $$A_{eff} = 2\pi (\int E^2 r\, dr)^2 / (\int E^4 r\, dr)$$

wherein the integration limits are zero to ∞, and E is the electric field associated with the propagated light.

The mode field diameter, $D_{mf}$, is measured using the Peterman II method wherein, $2w = D_{mf}$ and $w^2 = (2\int E^2\, r\, dr/\int (dE/dr)^2\, r\, dr)$, the intergral limits being 0 to ∞.

The relative index or relative refractive index of a segment, Δ%, as used herein, is defined by the equation, $$\Delta\% = 100 \times (n_i^2 - n_c^2)/2n_c^2$$

where $n_i$ is the maximum refractive index of the index profile segment denoted as i, and $n_c$, the reference refractive index, is taken to be the minimum index of the clad layer. Every point in the segment has an associated relative index.

The term refractive index profile or index profile is the relation between Δ% or refractive index and radius over a selected segment of the core.

Total dispersion, usually referred to as dispersion, is defined as the algebraic sum of waveguide dispersion and material dispersion. Total dispersion for single-mode fibers is also referred to as chromatic dispersion in the art. The units of total dispersion are ps/nm-km.

The bend resistance of a waveguide fiber is expressed as induced attenuation under prescribed test conditions. One bend test referenced herein is the macrobend test. Standard macrobend test conditions include 100 turns of waveguide fiber around a 75 mm diameter mandrel and 1 turn of waveguide fiber around a 32 mm diameter mandrel. In each test condition the bend induced attenuation, in units of dB/(unit length), is measured. In the present application, the macrobend test used is 5 turns of the waveguide fiber around a 20 mm diameter mandrel, a more demanding test which is required for the more severe operating environment of the present waveguide fiber.

Another bend test referenced herein is the lateral load microbend test. In this test a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. This increase in attenuation is the lateral load attenuation of the waveguide.

Waveguide designs which also are relatively easy to manufacture and which permit management of dispersion are favored, because of their low cost and added flexibility. Manufacturing costs are a significant factor in determining which fiber profile designs are practical to manufacture on a large scale. Fiber profile designs that include multiple core and cladding segments, as well as those fiber profile designs that include significant up-doping and/or down-doping of those segments are typically more difficult and more expensive to manufacture. Cores made of $GeO_2$—$SiO_2$ are less difficult and less expensive to manufacture than other types of cores, particularly those that include fluorine in the core, or pure silica in the central region of the core.

Preferably, the fibers disclosed herein are made by a vapor deposition process. Even more preferably, the fibers disclosed herein are made by an outside vapor deposition (OVD) process. Thus, for example, known OVD laydown and draw techniques may be advantageously used to produce the optical waveguide fiber disclosed herein. Other processes, such as modified chemical vapor deposition (MCVD) may be used. Thus, the refractive indices and the cross sectional profile of the optical waveguide fibers disclosed herein can be accomplished using manufacturing techniques known to those skilled in the art including, but in no way limited to, OVD and MCVD processes.

The fibers disclosed herein provide relatively low cost large effective area fibers that exhibit low PMD, improved bend resistance, and/or low attenuation, and which can effectively reduce non-linear dispersion effects. The optical waveguide described and disclosed herein preferably is of the step-index type, or in other words, the inventive optical waveguide fiber preferably has only a single segment core surrounded by a clad layer which preferably has a refractive index lower than that of the core.

FIG. 1 is a schematic representation (not to scale) of a preferred embodiment of an optical waveguide fiber disclosed herein having a single core segment 12 and a cladding or clad layer 14. Preferably, the cladding 14 is pure or substantially pure silica. The cladding 14 is surrounded by a primary coating P and a secondary coating S.

Figure 2:
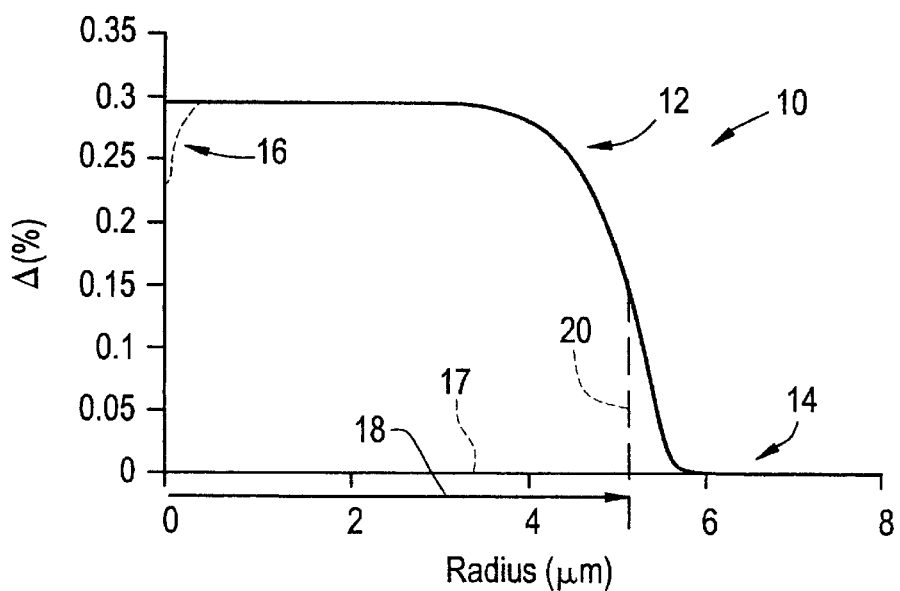
FIG. 2 is a diagram of a waveguide fiber refractive index profile of a single segment core optical waveguide according to the present invention.

FIG. 2 shows the relative refractive index percent ($\Delta\%$) charted versus waveguide radius of a preferred embodiment of the optical waveguide fiber disclosed herein. The core 12, as referred to herein, can thus be described by a refractive index profile, relative refractive index percent, $\Delta_1\%$, and an outside radius, $r_1$. As seen in FIG. 2, the clad layer has a refractive index of $n_c$ surrounding the core, wherein the outside radius $r_1$ of the core can be measured at a half-maximum point. That is, the outer radius 18, $r_1$, of the core 12 illustrated is about 5.15 $\mu$m as measured from the fiber centerline to the vertical line depending from the half maximum relative index point of the descending portion of core 12. The half maximum point is determined using the clad layer, i.e., $\Delta\%=0$, as referenced, shown by dashed line 17. For example, in FIG. 2, the core 12 has a peak refractive index or maximum relative index $\Delta_1\%$ of about 0.295%, thus, relative to the $\Delta\%=0$ of the clad layer, the magnitude is about 0.295%. Dashed vertical line 20 depends from the 0.1475% point, which is half of the maximum magnitude of $\Delta_1\%$.

FIG. 2 illustrates a general representation of the core refractive index profile which shows relative refractive index percent ($\Delta\%$) charted versus waveguide radius. Although FIG. 2 shows only a single segment core, it is understood that the functional requirements may be met by forming a core having more than a single segment. However, embodiments having fewer segments are usually easier to manufacture and are therefore preferred.

The index profile structure characteristic of the novel waveguide fiber is shown by core segment 12 having a positive $\Delta\%$. Central segment 12 of the illustrated waveguide fiber core has a step-shaped or step-index profile. The refractive index profile may be adjusted to reach a core design which provides the required waveguide fiber properties. Preferably, the optical waveguide fiber disclosed herein is not dispersion shifted.

It should be noted that line 14 of FIG. 2 represents the refractive index of the cladding which is used to calculate the refractive index percentage of the segments. Diffusion of dopant during manufacturing of waveguide fiber may cause rounding of the corners of the profiles, as illustrated in FIG. 2, and may cause a center line refractive index depression as represented by dotted line 16. It is possible, but often not necessary, to compensate somewhat for such diffusion, for example, in the doping step.

The core region and cladding layer preferably define a step-index refractive index profile. Preferably, the fibers disclosed herein have a maximum relative index $\Delta_1\%$ of between about 0.20% and about 0.35%, more preferably between about 0.24% and about 0.33%, even more preferably between about 0.26% and about 0.32%, and still more preferably between about 0.27% and about 0.31%. Preferably, the core radius of the fibers disclosed herein, measured at half the maximum or peak relative index, is between about 4.0 $\mu$m and about 7.0 $\mu$m, more preferably between about 4.5 $\mu$m and about 6.5 $\mu$m, and still more preferably between about 5.0 $\mu$m and about 6.2 $\mu$m.

Preferably, the effective area of the fibers disclosed herein is greater than or equal to about 90 $\mu m^2$. In one or more preferred embodiments, the effective area is between about 90 $\mu m^2$ and about 115 $\mu m^2$, more preferably between about 95 $\mu m^2$ and about 110 $\mu m^2$. One or more preferred embodiments of the optical waveguide fiber disclosed herein may have an effective area of between about 96 $\mu m^2$ and about 105 $\mu m^2$, and more preferably between about 99 $\mu m^2$ and about 102 $\mu m^2$.

The mode field diameter (MFD) of the fibers disclosed herein is preferably greater than about 10 $\mu$m. In preferred embodiments, the optical waveguide fiber disclosed herein may have an MFD of between about 10.0 $\mu$m and about 13.0 $\mu$m, and more preferably between about 10.0 $\mu$m and about 13.0 $\mu$m.

Preferably, the fibers disclosed herein exhibit microbending of less than or equal to about 3.0 dB/m, more preferably less than or equal to about 2.0 dB/m, even more preferably less than or equal to about 1.5 dB/m, even still more preferably less than or equal to about 1.0 dB/m, yet still more preferably less than or equal to about 0.8 dB/m, and even still more preferably less than or equal to about 0.5 dB/m. Even more preferably, these values of microbending are achieved with an effective area of greater than about 90 $\mu m^2$.

The fibers disclosed herein preferably exhibit an attenuation at a wavelength of about 1550 nm of less than or equal to about 0.25 dB/km, more preferably less than or equal to about 0.22 dB/km, even more preferably less than or equal to about 0.2 dB/km, yet more preferably less than or equal to about 0.19 dB/km, and most preferably less than about 0.185 dB/km.

In preferred embodiments, the fibers disclosed herein exhibit a total dispersion at a wavelength of about 1560 nm of preferably within the range of about 16 ps/nm-km to about 22 ps/nm-km, more preferably within the range of about 17 ps/nm-km to about 21 ps/nm-km, and even more preferably within the range of about 18 ps/nm-km to about 20 ps/nm-km.

The total dispersion slope at a wavelength of about 1550 nm of the fibers disclosed herein is preferably less than or equal to about 0.09 ps/nm$^2$-km. In one or more preferred embodiments, the total dispersion slope at a wavelength of about 1550 nm of the fibers disclosed herein is preferably between about 0.045 ps/nm$^2$-km and about 0.075 ps/nm$^2$-km, even more preferably between about 0.05 ps/nm$^2$-km and about 0.07 ps/nm$^2$-km, still more preferably between about 0.055 ps/nm$^2$-km and about 0.065 ps/nm$^2$-km.

Preferably, the PMD exhibited by the fibers disclosed herein is less than about 0.1 ps/km$^{1/2}$ (unspun), more preferably less than about 0.08 ps/km$^{1/2}$ (unspun), even more preferably less than about 0.05 ps/km$^{1/2}$ (unspun), still more preferably less than about 0.03 ps/km$^{1/2}$ (unspun), even still preferably less than about 0.02 ps/km$^{1/2}$ (unspun). In preferred embodiments, these values of PMD are achieved with an effective area of greater than about 90 $\mu m^2$.

In one preferred embodiment, the optical waveguide fiber disclosed herein relates to a single mode optical waveguide fiber having an effective area greater than or equal to about 90 $\mu m^2$ and a PMD of less than about 0.05 ps/km$^{1/2}$ (unspun).

In another preferred embodiment, the optical waveguide fiber disclosed herein relates to a single mode optical waveguide fiber having an effective area greater than or equal to about 90 $\mu m^2$ and which a PMD of less than about 0.02 ps/km$^{1/2}$ (unspun).

In preferred embodiments, the fibers disclosed herein have cabled cutoff wavelength of less than or equal to about 1500 nm, more preferably between about 1200 nm and about 1500 nm, even more preferably between about 1250 nm and about 1400 nm, and still more preferably between about 1300 nm and about 1375 nm. The zero dispersion wavelength of the fibers disclosed herein is preferably between about 1200 and about 1350 nm. The zero dispersion wavelength of one preferred embodiment of the optical waveguide fiber disclosed herein is around 1290 to 1300 nm.

Preferably, the macrobending loss of the optical waveguide fiber disclosed herein is less than about 30 dB/m, more preferably less than about 20 dB/m, even more preferably less than about 15 dB/m, yet still more preferably less than about 10 dB/m, even more preferably less than about 8 dB/m, yet even more preferably less than about 5 dB/m, and most preferably less than about 3 dB/m.

In preferred embodiments, the radii, relative refractive indices, and refractive profiles may be adjusted to achieve the following preferred results: a maximum relative index $\Delta_1\%$ of about 0.28; a core radius of about 5.5 $\mu$m; a total dispersion at 1560 nm of about 19.3 ps/nm-km; a slope at 1550 nm of about 0.060 ps/nm$^2$-km; an effective area of about 101 $\mu$m$^2$; an attenuation of less than or equal to about 0.188 dB/km; polarization mode dispersion of less than about 0.025 ps/km$^{1/2}$; a cable cutoff wavelength of about 1366 nm; and, a mode field diameter of about 11.4 $\mu$m. The wavelength at zero dispersion, $\lambda_0$, of a representative optical waveguide fiber disclosed herein was measured by a 2-meter test to be about 1296 nm. A primary coating having a Young's modulus of around 1.2 MPa and a secondary coating having a Young's modulus of around 950 MPa were found to be advantageous in one or more preferred embodiments. Macrobend values less than 7.75 dB/m using a 20 mm mandrel, 5 turn test were achieved. Microbend values less than 3.0 dB/m using a lateral load test were achieved.

The optical waveguide fiber disclosed herein has design parameters that permit about 25% larger mode field over typical known fibers, especially those having germania doped profiles, thereby providing significant advantages in the Erbium amplifier window.

The waveguide optical fiber having an optical profile as described above is also coated with a relatively soft primary coating and a relatively hard secondary coating which surrounds the primary coating. Commonly assigned U.S. patent application Nos. 60/173,673, 60/173,828 and 60/174,008, which are hereby incorporated by reference, describe suitable primary coatings in detail. Preferably, the modulus of elasticity of the secondary coating of the optical waveguide fiber disclosed herein is greater than 700 Mpa, more preferably greater than 800 Mpa, and most preferably over 900 MPa. Commonly assigned U.S. patent application No. 60/173,874, which is hereby incorporated by reference, describes in detail suitable secondary coatings having high moduli of elasticity.

The primary coating, sometimes referred to as the inner primary coating, is a soft cushioning layer which preferably has a Young's modulus of less than about 5 MPa, more preferably less than about 3 MPa, and even more preferably less than about 1.5 MPa.

A primary coating composition for the optical waveguide fiber disclosed herein preferably comprises an oligomer and at least one monomer. The composition may also contain a polymerization initiator which is suitable to cause polymerization (i.e., curing) of the composition after its application to a glass fiber. Polymerization initiators suitable for use in the primary coating compositions of the optical waveguide fiber disclosed herein include thermal initiators, chemical initiators, electron beam initiators, and photoinitiators. Particularly preferred are the photoinitiators, particularly those activated by UV radiation. The coating composition may also include an adhesion promoter.

The primary coating composition may desirably contain at least one ethylenically unsaturated oligomer and at least one ethylenically unsaturated monomer, although more than one oligomer component and/or more than one monomer can be introduced into the composition.

Thus, for example, an oligomer, monomer, and photoinitiator are combined to form a bulk composition. To this bulk composition, an amount of adhesion promoter, for example 1.0 part per hundred, is introduced in the bulk composition.

In addition to the above-described components, the primary coating composition of the optical waveguide fiber disclosed herein can optionally include any number of additives, such as reactive diluents, antioxidants, catalysts, lubricants, co-monomers, low molecular weight non-crosslinking resins, and stabilizers. Some additives (e.g. chain transfer agents, for example) can operate to control the polymerization process, thereby affecting the physical properties (e.g., modulus, glass transition temperature) of the polymerization product formed from the primary coating composition. Others can affect the integrity of the polymerization product of the primary coating composition (e.g., protect against de-polymerization or oxidative degradation). Other additives may include tackifier, reactive or non-reactive surfactant carriers.

The secondary coating is sometimes referred to as the outer primary coating. The secondary coating material is typically the polymerization (i.e., cured) product of a coating composition that contains urethane acrylate liquids whose molecules become cross-linked when polymerized.

Typical secondary coatings will include at least one UV curable monomer and at least one photoinitiator. The secondary coating may also include about 1–90 weight percent of at least one UV curable oligomer. It is preferred that the secondary coating is not a thermoplastic resin. Preferably, both the monomer and the oligomer are compounds capable of participating in addition polymerization. The monomer or the oligomer may be the major component of the secondary coating. An example of a suitable monomer is an ethylenically unsaturated monomer. Ethylenically unsaturated monomers may contain various functional groups, which enable their cross-linking. The ethylenically unsaturated monomers are preferably polyfunctional (i.e., each containing two or more functional groups), although monofunctional monomers can also be introduced into the composition. Therefore, the ethylenically unsaturated monomer can be a polyfunctional monomer, a monofunctional monomer, and mixtures thereof. Suitable functional groups for ethylenically unsaturated monomers used in accordance with the optical waveguide fiber disclosed herein include, without limitation, acrylates, methacrylates, acrylamides, N-vinyl amides, styrenes, vinyl ethers, vinyl esters, acid esters, and combinations thereof (i.e., for polyfunctional monomers).

In general, individual monomers capable of about 80% or more conversion (i.e., when cured) are more desirable than those having lower conversion rates. The degree to which monomers having lower conversion rates can be introduced into the composition depends upon the particular requirements (i.e., strength) of the resulting cured product. Typically, higher conversion rates will yield stronger cured products.

It may also be desirable to use certain amounts of monofunctional ethylenically unsaturated monomers, which can be introduced to influence the degree to which the cured product absorbs water, adheres to other coating materials, or behaves under stress.

Most suitable monomers are either commercially available or readily synthesized using reaction schemes known in the art.

Optical fiber secondary coating compositions may also contain a polymerization initiator which is suitable to cause polymerization (i.e., curing) of the composition after its application to a glass fiber or previously coated glass fiber. Polymerization initiators suitable for use in the compositions of the optical waveguide fiber disclosed herein include thermal initiators, chemical initiators, electron beam initiators, microwave initiators, actinic-radiation initiators, and photoinitiators. Particularly preferred are the photoinitiators. Any suitable photoinitiator can be introduced into compositions of the optical waveguide fiber disclosed herein.

In addition to the above-described components, the secondary coating composition of the optical waveguide fiber disclosed herein can optionally include an additive or a combination of additives. Suitable additives include, without limitation, antioxidants, catalysts, lubricants, low molecular weight non-crosslinking resins, adhesion promoters, and stabilizers. Some additives can operate to control the polymerization process, thereby affecting the physical properties (e.g., modulus, glass transition temperature) of the polymerization product formed from the composition. Others can affect the integrity of the polymerization product of the composition (e.g., protect against de-polymerization or oxidative degradation).

The secondary coating can be a tight buffer coating or, alternatively, a loose tube coating. However, it is preferred that the outer surface of secondary coating not be tacky so that adjacent convolutions of the optic fiber (i.e., on a process spool) can be unwound.

In preferred embodiments of the present invention, the primary coating comprises 10–90 wt % UV curable acrylate oligomer, 10–90 wt % UV curable acrylate monomer, 1–10 wt % photoinitiator, and 0–10 pph adhesion promoter. The primary coating preferably has a Youngs Modulus of less than about 5 Mpa, more preferably less than about 3 MPa, and even more preferably less than about 1.5 MPa.

In preferred embodiments of the present invention, the secondary coating comprises 0–90 wt % UV curable acrylate oligomer, 10–90 wt % UV curable acrylate monomer, and 1–10 wt % photoinitiator. Preferably, the secondary coating has a Young's modulus of at least about 700 MPa, more preferably at least about 900 MPa, and most preferably at least about 1100 MPa.

Various additives that enhance one or more properties of the primary or secondary coatings can also be present.

In preferred embodiments, the outer diameter of the overcladding is preferably about 125 $\mu$m, the outer diameter of the primary coating is preferably about 190 $\mu$m, and the outer diameter of the secondary coating is preferably about 250 $\mu$m. Thus, the primary coating preferably has a thickness of about 32.5 $\mu$m, and the secondary coating preferably has a thickness of about 30 $\mu$m.

The outer diameter of the primary coating may preferably be within the range of about 180 $\mu$m to about 200 $\mu$m, and the outer diameter of the secondary coating may preferably be within the range of about 245 $\mu$m to about 255 $\mu$m.

The following examples are provided to illustrate embodiments of coatings of the present invention, but they are by no means intended to limit its scope. In both the primary coating examples and the. secondary coating examples, oligomers, monomers and photoinitators are expressed in wt % adding up to a total of 100%. Other additives are expressed in parts per hundred by weight in addition to the 100% already totaled.

Examples of Primary Coating

TABLE 4

Formulation Compositions for Primary Coatings A–D

| Primary Coating | A | B | C | D |
| --- | --- | --- | --- | --- |
| Oligomer (1)-Wt % | BR3731-52% | BR3731-52% | BR3731-52% | BR3731-52% |
| Oligomer (2)-Wt % | | | | |
| Monomer (1)-Wt % | SR504-45% | SR504-25% | SR504-25% | Photomer 4003-45% |
| Monomer (2)-Wt % | | SR339-20% | SR495-20% | |
| Photoinitiator (1)-Wt % | Irgacure 1850-3% | Irgacure 1850-3% | Irgacure 1850-3% | Irgacure 819-1.5% Irgacure 184-1.5% |
| Adhesion promoter-pph | a-1.0 | a-1.0 | a-1.0 | a-0.3 b-2.0 |
| Antioxidant-pph | Irganox 1035-1 | Irganox 1035-1 | Irganox 1035-1 | Irganox 1035-1 |

In Table 4, BR3731 is an aliphatic urethane acrylate oligomer available from Bomar Specialty Co. (Winsted, Conn.); Purelast566A is an aliphatic urethane monoacrylate oligomer available from; SR504 is an ethoxylatednonylphenol acrylate monomer available from; Photomer 4003 is an ethoxylated nonyl phenol acrylate monomer available from Cognis Corporation (Ambler, Pa.); SR339 is a phenoxyethyl acrylate acrylate monomer available from Sartomer Company, Inc.; CN130 is an aliphaticoxyglycidyl acrylate monomer; SR495 is a caprolactone acrylate monomer available from Sartomer Company, Inc.; Irgacure 1850 is a BAPO photoinitiator blend containing bis(2,6-dimethoxybenzoyl)-2,4,4-trimethylpentyl phosphine oxide and 1-hydroxycyclohexyl phenyl ketone available from Ciba Specialty Chemicals (Tarrytown, N.Y.); Irgacure 819 is a bis(2,4,6-trimethylbenzoyl)-phenyl phosphine oxide photoinitiator available from Ciba Specialty Chemicals (Tarrytown, N.Y.); Irgacure 184 is a 1-hydroxycyclohexyl phenyl ketone photoinitiator available from Ciba Specialty Chemicals (Tarrytown, N.Y.); "a" is a 3-mercaptopropyltrimethoxysilane adhesion promoter available from United Chemical Technologies (Bristol, Pa.); "b" is a bis(rimethoxysilyethyl) benzene adhesion promoter available from Gelest, Inc. (Tullytown, Pa.); and Irganox 1035 is an antioxidant containing thiodiethylene bis(3,5-di-tert-butyl-4-hydroxy)hydrocinnamate available from Ciba Specialty Chemicals.

TABLE 5

Cured Film Properties of Primary Coatings A–D

| Primary Coating | A | B | C | D |
|---|---|---|---|---|
| Young's Modulus (MPa) | 0.82 | 1.21 | 1.29 | 1.23 |
| Y.M. stnd dev | 0.03 | 0.07 | 0.07 | 0.06 |
| Tensile Strength (MPa) | 0.63 | 1.06 | 0.82 | 0.89 |
| T. Strength stnd dev | 0.22 | 0.3 | 0.22 | 0.25 |
| % Elongation | 184 | 164 | 123 | 137 |
| % E. stnd dev | 45.51 | 40.36 | 32.39 | 34 |
| $T_g^a$ (° C.) | −34 | −24 | −36 | −35 |

[a] $T_g$'s (glass transition temperatures) were measured by dynamic mechanical analysis at 1 Hz.

Examples of Secondary Coating

TABLE 6

Secondary Coating Composition Formulations

| | Oligomer | wt % | Monomer(s) | wt % | Photoinitiator | wt % | Additive(s) pph |
|---|---|---|---|---|---|---|---|
| A | BR301 | 10% | SR601 | 30% | Irgacure 1850 | 3% | — |
|   |       |     | SR602 | 27% |               |    |   |
|   |       |     | SR349 | 30% |               |    |   |
| B | Photomer 6010 | 10% | Photomer 4025 | 20% | Irgacure 1850 | 3% | — |
|   |       |     | Photomer 4028 | 42% |               |    |   |
|   |       |     | RCC12-984 | 25% |               |    |   |
| C | — |  | SR601 | 30% | Irgacure 1850 | 3% | — |
|   |   |  | SR602 | 37% |               |    |   |
|   |   |  | SR349 | 15% |               |    |   |
|   |   |  | SR399 | 15% |               |    |   |
| D | BR301 | 18.2% | Photomer 4025 | 15.4% | Irgacure 1850 | 2.7% | — |
|   |       |       | Photomer 4028 | 36.4% |               |      |   |
|   |       |       | RCC12-984 | 27.3% |               |      |   |
| F | KWS 4131 | 10% | Photomer 4028 | 82% | Irgacure 819 | 1.5% | Irganox 1035 0.5 |
|   |          |     | Photomer 3016 | 5% | Irgacure 184 | 1.5% |   |

Of the oligomers listed in Table 6, BR301 is an aromatic urethane acrylate oligomer available from Bomar Specialty Co., Photomer 6010 is an aliphatic urethane acrylate oligomer available from Cognis Corporation, and KWS4131 is an aliphatic urethane acrylate oligomer available from Bomar Specialty Co.

Of the monomers listed in Table 6, SR601 is an ethoxylated(4) bisphenol A diacrylate monomer available from Sartomer Company, Inc., SR602 is a ethoxylated(10) bisphenol A diacrylate monomer available from Sartomer Company, Inc., SR349 is an ethoxylated(2) bisphenol A diacrylate monomer available from Sartomer Company, Inc., SR399 is a dipentaerythritol pentaacrylate available from Sartomer Company, Inc., Photomer 4025 is an ethoxylated(8) bisphenol A diacrylate monomer available from Cognis Corporation, Photomer 4028 is an ethoxylated (4) bisphenol A diacrylate monomer available from Cognis Corporation, RCC12-984 is an ethoxylated(3) bisphenol A diacrylate monomer available from Cognis Corporation, and Photomer 3016 is an epoxy acrylate available from Cognis Corporation.

Of the photoinitiators listed in Table 6, Irgacure 1850 is a blend of 1-hydroxycyclohexyl phenyl ketone and bis(2,6-dimethoxybenzoyl)-2,4,4-trimethylpentyl phosphine oxide available from Ciba Specialty Chemical, Irgacure 819 is a bis(2,4,6-trimethylbenzoyl)-phenyl phosphine oxide photo-initiator available from Ciba Specialty Chemicals, and Irgacure 184 is a 1-hydroxycyclohexyl phenyl ketone photoinitiator available from Ciba Specialty Chemicals.

Of the additives listed in Table 6, Irganox 1035 is an antioxidant containing thiodiethylene bis(3,5-di-tert-butyl-4-hydroxy)hydrocinnamate available from Ciba Specialty Chemical.

The tested properties of the secondary coating composition formulations are listed in Table 7.

TABLE 7

Properties of Secondary Coatings/Composition

| | Elongation (%) | Tensile Strength (MPa) | Young's Modulus (MPa) | Water Absorption (%) | Viscosity at 25°/45° C. (poise) |
|---|---|---|---|---|---|
| A | 25.83 | 27.47 | 958.88 | 1.66 | 23.7/3.8 |
| B | 22.41 | 17.01 | 803.52 | — | 20.2/3.8 |
| C | 10.34 | 27.56 | 1229.41 | 1.81 | 13.2/2.6 |
| D | 22.5 | 28.78 | 997.05 | 1.73 | 45.0/6.5 |
| E | 12.7 | 25.26 | 1207 | — | — |

One preferred example of the present invention comprises a $GeO_2$ doped core and a clad layer surrounding and in contact with the core, a primary coating having a Young's modulus of about 1.2 MPa surrounding the clad layer, and a secondary coating having a Young's modulus of about 950 MPa surrounding the primary coating, wherein the core and cladding have a step index profile having a maximum relative refractive index of about 0.28% and a core radius of about 5.5 μm.

We have found that by combining a step index, $GeO_2$ doped profile with secondary coatings having a Young's modulus of at least about 700 MPa, we can obtain increased effective area ($A_{eff}$), decreased bend loss, and attenuation less than about 0.185 dB/km. In particular, microbend lateral load losses of less than about 0.37 dB/m were achieved. Consequently, the Young's modulus of the secondary coating is preferably at least about 700 MPa, more preferably at least about 900 MPa, and most preferably at least about 1100 MPa.

Figure 3:
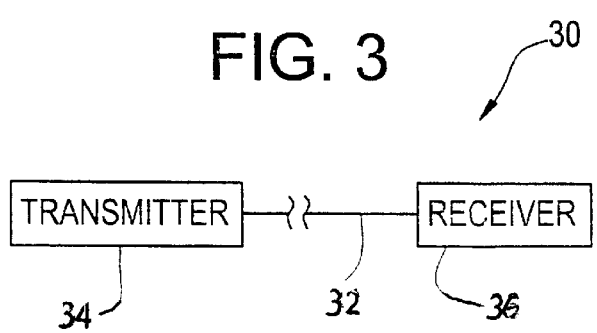
FIG. 3 is a schematic view of a fiber optic communication system employing an optical fiber of the present invention.

As shown in FIG. 3, and in accordance with the present invention, an optical fiber 32 is manufactured in accordance with the present invention and used in an optical fiber communication system 30. System 30 includes a transmitter 34 and a receiver 36, wherein optical fiber 32 allows transmission of an optical signal between transmitter 34 and receiver 36. In most systems, each end of fiber 32 will be capable of 2-way communication, and transmitter 34 and receiver 36 are shown for illustration only. In at least one preferred embodiment, an optical fiber communication system according to the present invention comprises a transmitter and receiver connected by an optical fiber without the presence of a regenerator therebetween. In another preferred embodiment, an optical fiber communication system according to the present invention comprises a transmitter and receiver connected by an optical fiber without the presence of an amplifier therebetween. In yet another preferred embodiment, an optical fiber communication system according to the present invention comprises a transmitter and receiver connected by an optical fiber having neither an amplifier nor a regenerator nor a repeater therebetween.

In a preferred embodiment, substantially no fluorine is present from the centerline of the fiber disclosed herein to the outer radius of the cladding. In another preferred embodiment, substantially no fluorine is present from the centerline of the fiber to a radius of about 125 μm. In yet another preferred embodiment, no fluorine is present from the centerline of the fiber disclosed herein to the outer radius of the cladding. In still another preferred embodiment, no fluorine is present from the centerline of the fiber to a radius of about 125 μm.

In another preferred embodiment, substantially no fluorine is present from the centerline of the fiber disclosed herein to a radius of about 50 μm. In yet another preferred embodiment, no fluorine is present from the centerline of the fiber to a radius of about 50 μm.

In another preferred embodiment, substantially no fluorine is present from the centerline of the fiber disclosed herein to a radius of about 25 μm. In yet another preferred disclosed, no fluorine is present from the centerline of the fiber to a radius of about 25 μm.

In another preferred embodiment, substantially no fluorine is present from the centerline of the fiber disclosed herein to a radius of about 10 μm. In yet another preferred embodiment, no fluorine is present from the centerline of the fiber to a radius of about 10 μm.

Preferably, the optical waveguide fiber disclosed herein is a non-dispersion-shifted fiber.

Preferably, the fibers disclosed herein have a low water content, and preferably are low water peak optical fibers, i.e. having an attenuation curve which exhibits a relatively low, or no, water peak in a particular wavelength region. Thus, the fibers disclosed herein are preferably low water peak fibers.

Methods of producing low water peak optical fiber can be found in U.S. application Ser. No. 09/722,804 filed Nov. 27, 2001, U.S. application Ser. No. 09/547,598 filed Apr. 11, 2000, U.S. Provisional Application Serial No. 60/258,179 filed Dec 22, 2000, and U.S. Provisional Application Serial No. 60/275,015 filed Feb. 28, 2001, the contents of each being hereby incorporated by reference.

Figure 4:
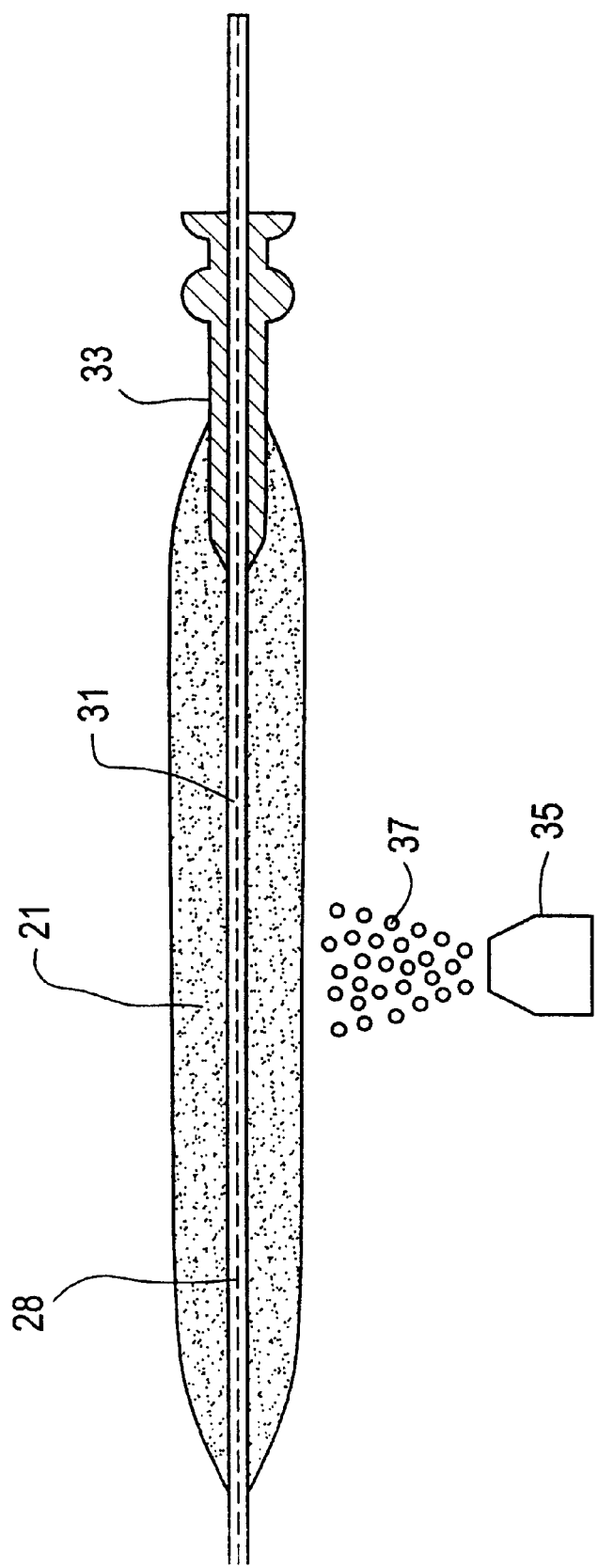
FIG. 4 is a schematic representation of laydown of a soot preform.

As exemplarily illustrated in FIG. 4, soot preform or soot body 21 is preferably formed by chemically reacting at least some of the constituents of a moving fluid mixture including at least one glass-forming precursor compound in an oxidizing medium to form a silica-based reaction product. At least a portion of this reaction product is directed toward a substrate, to form a porous silica body, at least a portion of which typically includes hydrogen bonded to oxygen. The soot body may be formed, for example, by depositing layers of soot onto a bait rod via an OVD process. Such an OVD process is illustrated in FIG. 4.

As shown in FIG. 4 a substrate or bait rod or mandrel 31 is inserted through a glass body such as hollow or tubular handle 33 and mounted on a lathe (not shown). The lathe is designed to rotate and translate mandrel 31 in close proximity with a soot-generating burner 35. As mandrel 31 is rotated and translated, silica-based reaction product 37, known generally as soot, is directed toward mandrel 31. At least a portion of silica-based reaction product 37 is deposited on mandrel 31 and on a portion of handle 33 to form a body 21 thereon. Other methods of chemically reacting at least some of the constituents of a moving fluid mixture, such as, but not limited to, liquid delivery of at least one glass-forming precursor compound in an oxidizing medium can be used to form the silica-based reaction product of the present invention, as disclosed, for example, in U.S. Provisional Patent application Serial No. 60/095,736, filed on Aug. 7, 1997, and PCT Application Serial No. PCT/US98/25608, filed on Dec. 3, 1998, the contents of which are hereby incorporated by reference.

Once the desired quantity of soot has been deposited on mandrel 31, soot deposition is terminated and mandrel 31 is removed from soot body 21.

Figure 5:
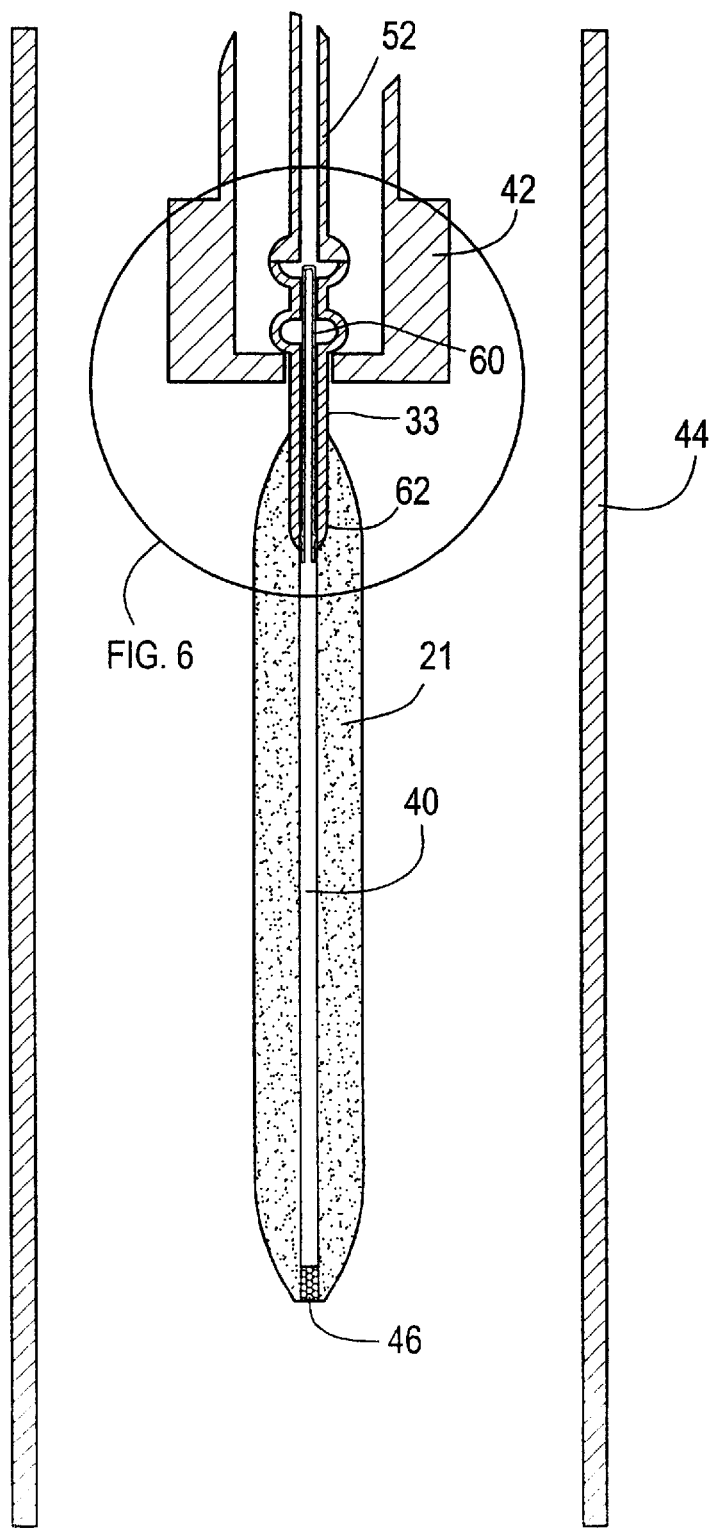
FIG. 5 is a schematic representation of a preform having both ends of its centerline hole plugged.
Figure 6:
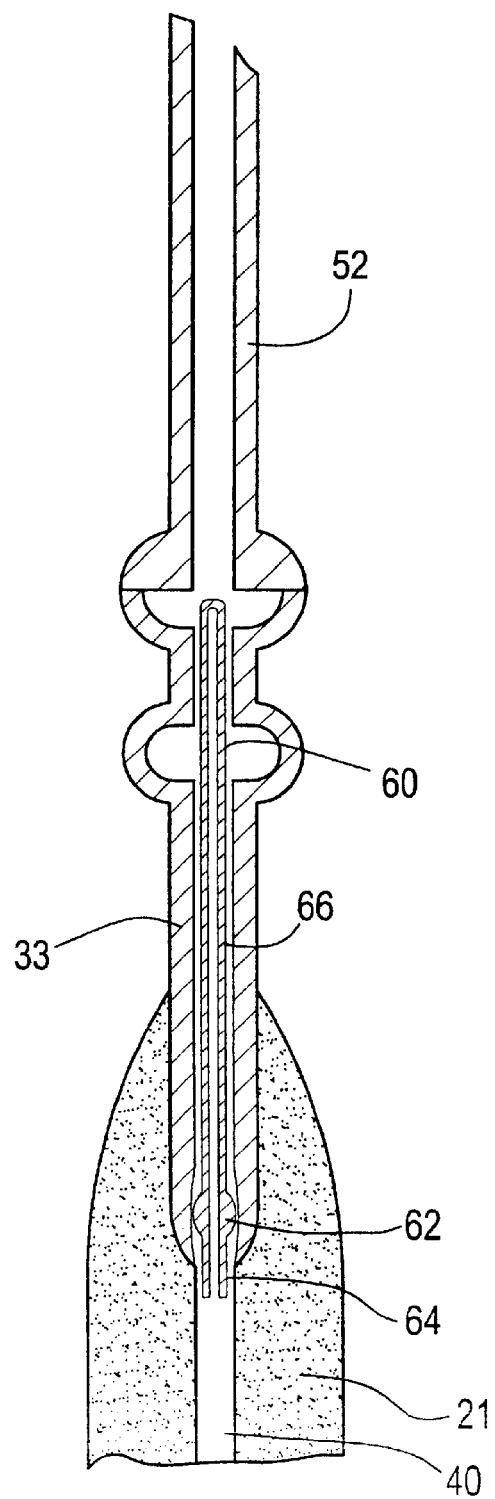
FIG. 6 is a closeup view of the plugged preform of FIG. 7 showing the top plug.

As depicted in FIGS. 5 and 6 upon removal of mandrel 31, soot body 21 defines a centerline hole 40 passing axially therethrough. Preferably, soot body 21 is suspended by handle 33 on a downfeed handle 42 and positioned within a consolidation furnace 44. The end of centerline hole 40 remote from handle 33 is preferably fitted with a bottom plug 46 prior to positioning soot body 21 within consolidation furnace 44. Preferably, bottom plug 46 is positioned and held in place with respect to soot body 21 by friction fit. Plug 46 is further preferably tapered to facilitate entry and to allow at least temporary affixing, and at least loosely, within the soot body 21.

Soot body 21 is preferably chemically dried, for example, by exposing soot body 21 to a chlorine containing atmosphere at elevated temperature within consolidation furnace 44. Chlorine containing atmosphere 48 effectively removes water and other impurities from soot body 21, which otherwise would have an undesirable effect on the properties of optical waveguide fiber manufactured from soot body 21. In an OVD formed soot body 21, the chlorine flows sufficiently through the soot to effectively dry the entire blank, including the centerline region surrounding centerline hole 40.

Following the chemical drying step, the temperature of the furnace is elevated to a temperature sufficient to consolidate the soot blank into a sintered glass preform, preferably about 1500° C. The centerline hole 40 is closed during the consolidation step. In a preferred embodiment, the centerline region has a weighted average OH content of less than about 1 ppb.

Preferably, the centerline hole does not have an opportunity to be rewet by a hydrogen compound prior to centerline hole closure.

Preferably, exposure of the centerline hole to an atmosphere containing a hydrogen compound is significantly reduced or prevented by closing the centerline hole during consolidation.

In a preferred embodiment, a glass body such as bottom plug 46 is positioned in centerline hole 40 at the end of soot body 21 remote from handle 33, and a glass body such as hollow tubular glass plug or top plug 60 having a open end 64 is positioned in centerline hole 40 in soot body 21 opposite plug 46 as shown in FIG. 5. Top plug 60 is shown disposed within the cavity of tubular handle 33. Following chlorine drying, soot body 21 is down driven into the hot zone of consolidation furnace 44 to seal centerline hole 40 and consolidate soot body 21 into a sintered glass preform. Drying and consolidation may optionally occur simultaneously. During consolidation, soot body 21 contracts somewhat and engages bottom plug 46 and the lower end of top plug 60, thereby fusing the resulting sintered glass preform to plug 46 and plug 60 and sealing the centerline hole 40. Sealing of both the top and bottom of centerline hole 40 can be accomplished with one pass of soot body 21 through the hot zone. Preferably, sintered glass preform is held at an elevated temperature, preferably in a holding oven, to allow inert gas to diffuse from centerline hole 40 to form a passive vacuum within sealed centerline hole 40. Preferably, top plug 60 has a relatively thin wall through which diffusion of the inert gas can more expediently occur. As depicted in FIG. 6 top plug 60 preferably has an enlarged portion 62 for supporting plug 60 within handle 33, and a narrow portion 64 extending into centerline hole 40 of soot body 21. Plug 60 also preferably includes an elongated hollow portion 66 which may preferably occupy a substantial portion of handle 33. Hollow portion 66 provides additional volume to centerline hole 40 thereby providing a better vacuum within centerline hole 40 following diffusion of the inert gas.

The volume provided by elongated portion 66 of plug 60 provides added volume to sealed centerline hole 40, advantages of which will be described in greater detail below.

As described above and elsewhere herein, bottom plug 46 and top plug 60 are preferably glass bodies having a water content of less than about 31 ppm by weight, such as fused quartz plugs, and preferably less than 5 ppb by weight, such as chemically dried silica plugs. Typically, such plugs are dried in a chlorine-containing atmosphere, but an atmosphere containing other chemical drying agents are equally applicable. Ideally, the glass plugs will have a water content of less than 1 ppb by weight. In addition, the glass plugs are preferably thin walled plugs ranging in thickness from about 200 μm to about 2 mm. Even more preferably, at least a portion of plug 60 has a wall thickness of about 0.2 to about 0.5 mm. More preferably still, elongated portion 66 has a wall thickness of about 0.3 mm to about 0.4 mm. Thinner walls promote diffusion, but are more susceptible to breakage during handling.

Thus, inert gas is preferably diffused from the centerline hole after the centerline hole has been sealed to create a passive vacuum within the centerline hole, and thin walled glass plugs can facilitate rapid diffusion of the inert gas from the centerline hole. The thinner the plug, the greater the rate of diffusion.

Even after having sealed the centerline hole at both ends, the centerline hole region of the sintered glass preform can be rewet by hydroxyl ions migrating or emanating from the glassware which is in contact with the centerline hole, the glassware being other than the silica material which is further formed into optical waveguide fiber. Thus, for example, hydroxyl ions in the glass body such as the top plug 60 could migrate to, and to contaminate or rewet, the centerline hole region of the sintered glass preform 21. By substantially replacing the OH ions in glass bodies such as plug 60 before inserting same into, onto, or near the soot body 21, rewetting of the centerline hole region could be even further prevented.

Thus, optical waveguide fiber which has been subsequently drawn from a preform formed in the above manner exhibits lower optical attenuation compared to fiber drawn from preforms which had no deuterated glass bodies in contact with and/or sealing the centerline hole. In particular, ultra low optical attenuation at or around 1383 nm can be achieved by preferably utilizing at least one deuterated glass body in the manner described above. Consequently, overall lower O—H overtone optical attenuation can be achieved. For example, the water peak at 1383 nm, as well as at other OH induced water peaks, such as at 950 nm or 1240 nm, can be lowered according to the present invention, and even virtually eliminated.

Even more preferably, all glass bodies which are to be placed in contact with the centerline hole before disposing same in, on, or near a soot body or silica-based reaction product or sintered glass preform are pre-deuterized.

It should be noted that providing one or more deuterated bodies for disposing in, on or proximate a soot body or sintered glass preform or reaction product(s) in order to obtain the beneficial results discussed above is not limited to an OVD process, and furthermore is not limited to a particular means of sealing the centerline hole, passively or actively inducing a vacuum in the centerline hole, or otherwise closing the centerline hole. For example, additional methods for closing the centerline hole are disclosed in U.S. Provisional Patent Application No. 60/131,012, filed Apr. 26, 1999, titled "Optical Fiber Having Substantially Circular Core Symmetry and Method of Manufacturing Same", and in U.S. patent application Ser. No. 547,598, filed on Apr. 11, 2000, entitled "Low Water Peak Optical Waveguide and Method of Making Same", and U.S. Provisional Patent Application No. 60/131,033, filed Apr. 26, 1999, the contents of which are hereby incorporated by reference.

In one preferred embodiment, plug 60 was exposed to 5% deuterium in a helium atmosphere at 1 atm at about 1000° C. for about 24 hours. In another preferred embodiment, plug 60 was exposed to 3% deuterium in a nitrogen atmosphere at 1 atm at about 1000° C. for about 24 hours.

At redraw, the sintered glass preforms formed as described above are suspended within a furnace 68 by downfeed handles 42. The temperature within furnace 68 is elevated to a temperature which is sufficient to stretch the glass preforms, preferably about 1950° C. to about 2100° C., and thereby reduce the diameters of the preforms to form a cylindrical glass body such as a core cane. A sintered or consolidated glass preform, corresponding to soot body 21, is heated and stretched to form a reduced core cane having a centerline region. Centerline hole 40 closes to form the centerline region during the redraw process. The reduced pressure maintained within sealed centerline hole 40 created passively during consolidation, is generally sufficient to facilitate complete centerline hole 40 closure during redraw.

The reduced diameter core cane, a portion of which preferably constitutes cladding, produced by any of the above-described embodiments can be overclad, such as by further soot deposition, for example by an OVD process or with a rod-in-tube arrangement, and subsequently drawn into an optical waveguide fiber having a central core portion bounded by a cladding glass.

Figure 7:
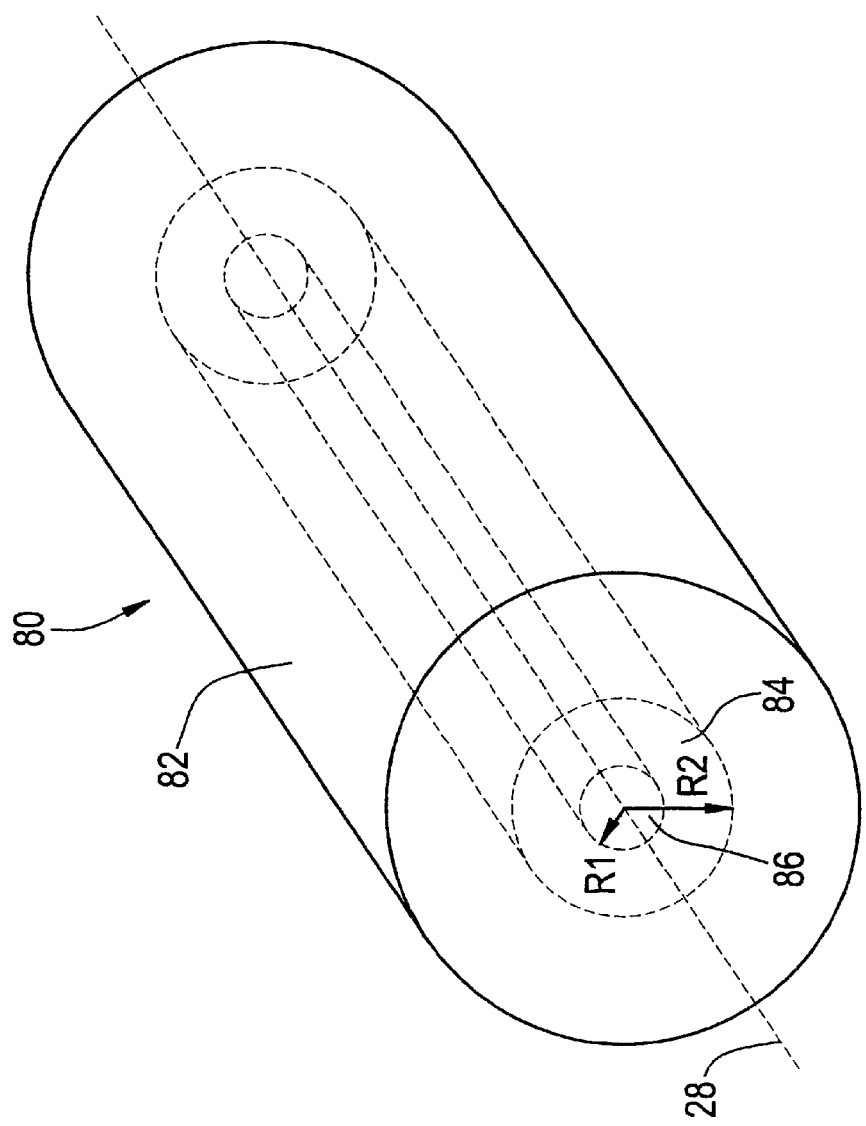
FIG. 7 is a schematic representation of a preform or an optical fiber having a closed centerline region.

As shown FIG. 7, cylindrical optical fiber body 80 includes a silica containing glass region 82, at least a portion of which includes hydrogen bonded to oxygen. Silica containing glass region 82 includes a centerline region 84 having a weighted average OH content of less than about 2 ppb, and preferably less than about 1 ppb. Centerline region 84 bounds a smaller diameter dopant (preferably germania) containing region 86 (depicted by radial distance Rj), and both centerline region 84 and dopant containing region 86 extend longitudinally along central axis 28 of cylindrical optical fiber body 80.

Centerline region 84, represented by radial distance R2 as depicted in FIG. 4 is defined as that portion of the optical fiber body 80 wherein about 99% of the propagated light travels.

The optical fiber body 80 represents either a glassy preform which serves as a precursor to an optical waveguide fiber, or the fiber itself, as the relative dimensions of the regions at a given cross-section are at least generally preserved after drawing the optical fiber preform into a fiber.

In at least one preferred embodiment, the centerline region 84 contains no fluorine dopant. In another preferred embodiment, the dopant containing region 86 contains no fluorine dopant. In yet another preferred embodiment, the region surrounding centerline region 84 contains no fluorine dopant. In still another preferred embodiment, the cylindrical glass body 21 contains no fluorine dopant.

In at least one preferred embodiment, the cylindrical glass body 21 contains no phosporus.

In another preferred embodiment, the core and cladding each have a respective refractive index which form a step-index profile.

The drawn optical waveguide fiber is then preferably deuterized. Deuteration can be carried out by a number of various processes, and may be achieved by maintaining a silica body or part thereof at an elevated temperature in an atmosphere comprising deuterium. Appropriate heat treating times and temperatures can be determined from data available in the literature. DO/OH exchange in silica may occur at temperatures as low as 150° C., although treatment is more preferably carried out at higher temperatures, typically above about 500° C. The atmosphere can be either substantially $D_2$ or may also comprise inert diluents, e.g., $N_2$ or Ar. The time required for substantially complete deuterium/hydrogen (D/H) exchange throughout a volume of silica depends substantially exponentially on the temperature, at least approximately on the square of the diffusion distance, and approximately proportionally to the OH— concentration initially present in the silica body. The skilled artisan can estimate required heat treating times from data available in the literature. The required time also depends to some degree on the concentration of deuterium in contact with the silica body. Typically, a deuterium partial pressure of at least about 10 Torr can produce effective infusion of deuterium at appropriate temperatures.

Thus, for a given D2 concentration, treatment times and temps could also be varied with equivalently effective results, independent of the carrier gas type. D2 concentration could be also be varied with correspondingly varied time and temp and yield equivalently effective results.

In preferred embodiments, the resulting fiber exhibits an optical attenuation at a wavelength of about 1383 nm which is less than or equal to an optical attenuation exhibited at a wavelength of about 1310 nm.

Preferably, the optical waveguide fiber exhibits a maximum hydrogen induced attenuation change of less than about 0.03 dB/km at a wavelength of 1383 nm after being subjected to a 0.01 atm hydrogen partial pressure for at least 144 hours. Even more preferably, the resulting fiber exhibits an optical attenuation at a wavelength of about 1383 nm which is at least 0.04 dB/km less than the optical attenuation exhibited at a wavelength of about 1310 nm. Even more preferably, the optical attenuation exhibited at a wavelength of about 1383 nm is less than or equal to about 0.35 dB/km. Still more preferably, the optical attenuation exhibited at a wavelength of about 1383 nm is less than or equal to about 0.31 dB/km.

Figure 8:
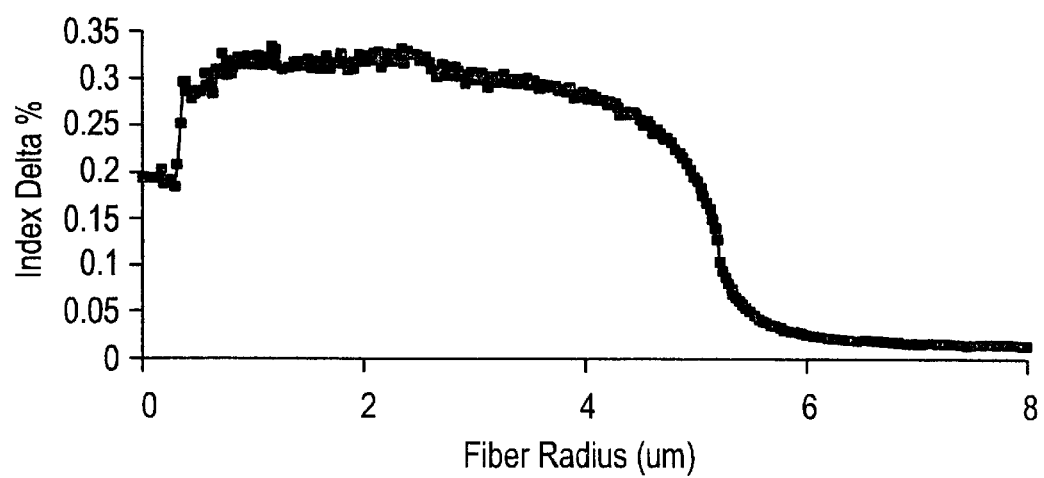
FIG. 8 shows a refractive index profile measurement corresponding to a preferred embodiment of an optical waveguide fiber in accordance with the present invention.

FIG. 8 is a refractive index profile corresponding to one preferred embodiment of the fiber disclosed herein which was derived from measurements of a fabricated optical fiber preform or cane, wherein the refractive index profile was mapped to the fiber space. The outer radius 18, $r_1$, of the core 12 is about 5.1 μm as measured from the fiber centerline to the vertical line depending from the half maximum relative index point of the descending portion of core 12. The half maximum point is determined using the clad layer, i.e., $\Delta\%=0$, as referenced, shown by dashed line 17. The core 12 generally has a refractive index of about 0.30% and a peak refractive index or maximum relative index $\Delta_1\%$ of about 0.33%, thus, relative to the $\Delta\%=0$ of the clad layer, the magnitude is about 0.33%. Dashed vertical line 20 depends from the 0.165% point, which is half of the maximum magnitude of $\Delta_1\%$, at a radius of about 5.08 μm.

Central segment 12 of the waveguide fiber core illustrated in FIG. 8 has a step-shaped or step-index profile with an alpha of about 9. Preferably, the central segment of the core has an alpha greater than about 5, more preferably greater than about 6. In preferred embodiments, the alpha is between about 7 and about 14. A center line refractive index depression 16 with a radius of about 0.37 μm appears at or near the centerline of the fiber. The refractive index in the centerline depression is generally around 0.2%.

Figure 9:
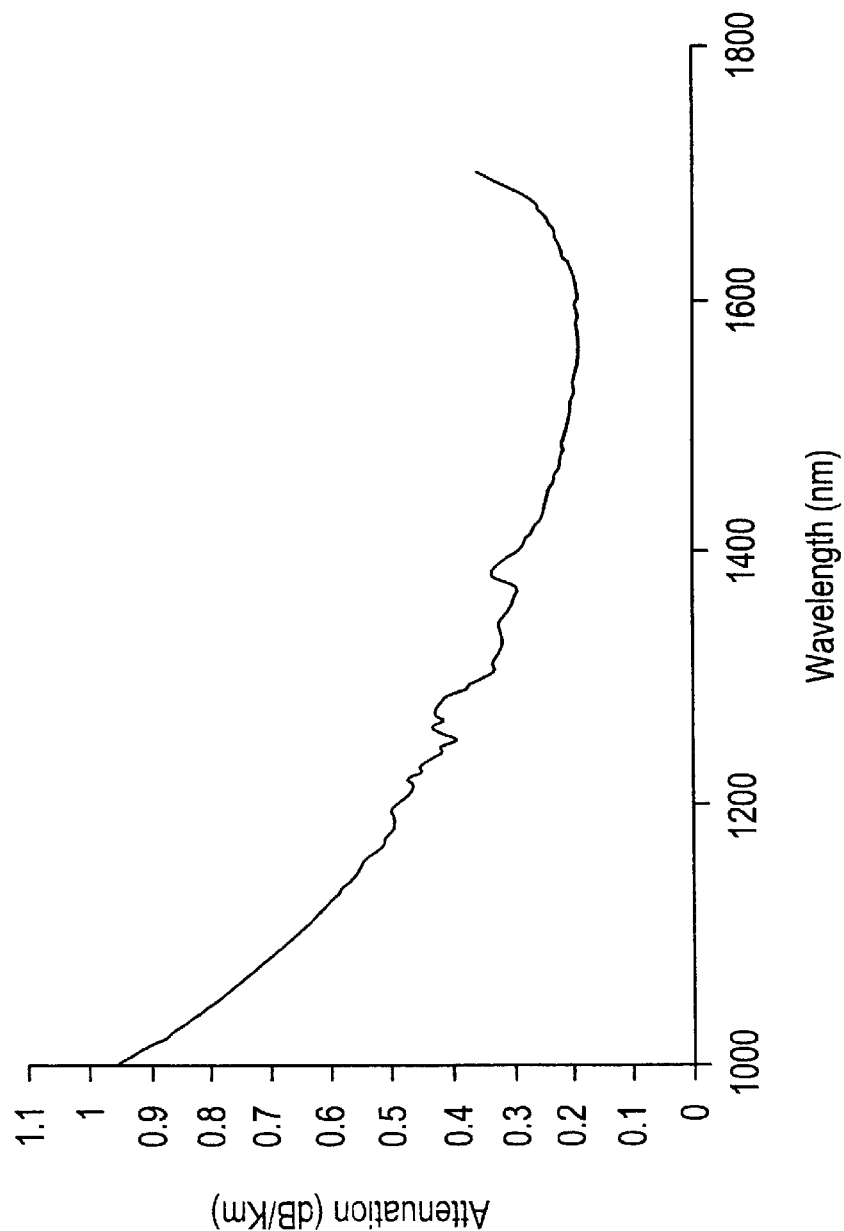
FIG. 9 is a graph of measured loss or attenuation for the preferred embodiment of the optical fiber having a refractive index profile corresponding to FIG. 8.

FIG. 9 shows the measured loss or attenuation for one preferred embodiment of the optical fiber having a refractive index profile corresponding to FIG. 8. Attenuation in dB/km is plotted versus wavelength in nm. Measured and theoretically calculated fiber attenuation appears below in Table 8.

TABLE 8

| Wavelength (nm) | Measured Loss (dB/km) | Theoretical Loss (dB/km) | Net Loss above Theoretical (dB/km) |
|---|---|---|---|
| 1310 | 0.33 | 0.32 | 0.01 |
| 1380 | 0.329 | 0.271 | 0.058 |
| 1383 | 0.329 | 0.269 | 0.060 |
| 1385 | 0.329 | 0.267 | 0.062 |

As seem from Table 8, a relatively low water peak is exhibited by the optical fiber at around 1383 nm.

Preferably, the attenuation of the optical fiber at 1383 nm is not more than 0.1 dB/km higher than its attenuation at 1310 nm, more preferably the attenuation of the optical fiber at 1383 nm is not more than 0.05 dB/km higher than its attenuation at 1310 nm, and even more preferably the attenuation of the optical fiber at 1383 nm is not more than 0.01 dB/km higher than its attenuation at 1310 nm. Still more preferably, the attenuation of the optical fiber at 1383 nm is less than or equal to its attenuation at 1310 nm.

Preferably, the attenuation of the optical fiber at 1380 nm is less than or equal to about 0.40 dB/km, more preferably is less than or equal to about 0.36 dB/km, and even more preferably is less than or equal to about 0.34 dB/km.

A low water peak permits more efficient operation in the wavelength range from around 1290 nm to around 1650 nm with lower attenuation losses, especially for transmission signals between about 1340 nm and about 1470 nm. Furthermore, a low water peak also affords improved pump efficiency of a pump light emitting device which is optically coupled to the optical fiber, such as a Raman pump or Raman amplifier which may operate at one or more pump wavelengths. Preferably, a Raman amplifier pumps at one or more wavelengths which are about 100 nm lower than a desired operating wavelength or wavelength region. For example, an optical fiber carrying an operating signal at wavelength of around 1550 nm may be pumped with a Raman amplifier at a pump wavelength of around 1450 nm. Thus, the lower fiber attenuation in the wavelength region from about 1400 nm to about 1500 nmn would tend to decrease the pump attenuation and increase the pump efficiency, e.g. gain per mW of pump power, especially for pump wavelengths around 1400 nm. Generally, for greater OH impurities in a fiber, the water peak grows in width as well as in height. Therefore, a wider choice of more efficient operation, whether for operating signal wavelengths or amplification with pump wavelengths, is afforded by the smaller water peak.

In a preferred embodiment, the optical waveguide fiber disclosed herein comprises a core having a refractive index profile defined by a radius and a relative refractive index percent, wherein the core contains germania, and a clad layer surrounding and in contact with the core and having a refractive index profile defined by a radius and a relative refractive index percent, wherein the core and the clad layer provide an effective area greater than about 90 $\mu m^2$, and wherein the attenuation of the optical fiber at 1383 nm is not more than 0.1 dB/km higher than its attenuation at 1310 nm.

Pump wavelength for a Raman amplifier preferably depends upon the wavelength of the operating signal or transmission signal to be amplified. In preferred embodiments, transmission signals in the wavelength range between about 1530 nm to about 1560 nm, which may be referred to as the C-band, Raman pump wavelength is preferably in the range of about 1420 nm to about 1450 nm; transmission signals in the wavelength range between about 1560 nm to about 1620 nm range, which may be referred to as the L-band, Raman pump wavelength is preferably in the range of about 1450 nm to about 1510 nm; and transmission signals in the wavelength range of about 1460 nm to about 1530 nm range, which may be referred to as the S-band, Raman pump wavelength is preferably in the range of about 1380 nm to 1400 nm.

The fibers disclosed herein exhibit low PMD values when fabricated with OVD processes. Methods and apparatus for achieving low polarization mode dispersion (PMD) in an optical fiber or fiber section can be found in U.S. Provisional Application Serial No. 60/309,160 filed Jul. 31, 2001 and in PCT/US00/10303 filed Apr. 17, 2000, and additional methods and apparatus relating to the centerline aperture region of a preform can be found in U.S. application No. Ser. 09/558,770, filed Apr. 26, 2000, entitled "An Optical Fiber and a Method for Fabricating a Low Polarization-Mode Dispersion and Low Attenuation Optical Fiber", and in U.S. Provisional Application No. 60/131,033, filed Apr. 26, 1999, entitled "Low Water Peak Optical Waveguide and Method of Manufacturing Same", all of which are incorporated herein by reference. Spinning of the fiber may also lower PMD values for the fiber disclosed herein. In preferred embodiments, fibers disclosed herein which have been spun exhibited PMD of less than or equal to 0.006 ps/km$^{1/2}$. In one preferred embodiment, the fiber exhibited PMD of 0.005 ps/km$^{1/2}$.

In a preferred embodiment, the optical waveguide fiber disclosed herein comprises a core having a refractive index profile defined by a radius and a relative refractive index percent, wherein the core contains germania, and a clad layer surrounding and in contact with the core and having a refractive index profile defined by a radius and a relative refractive index percent, wherein the core and the clad layer PMD of less than about 0.1 ps/km$^{1/2}$.

Figure 10:
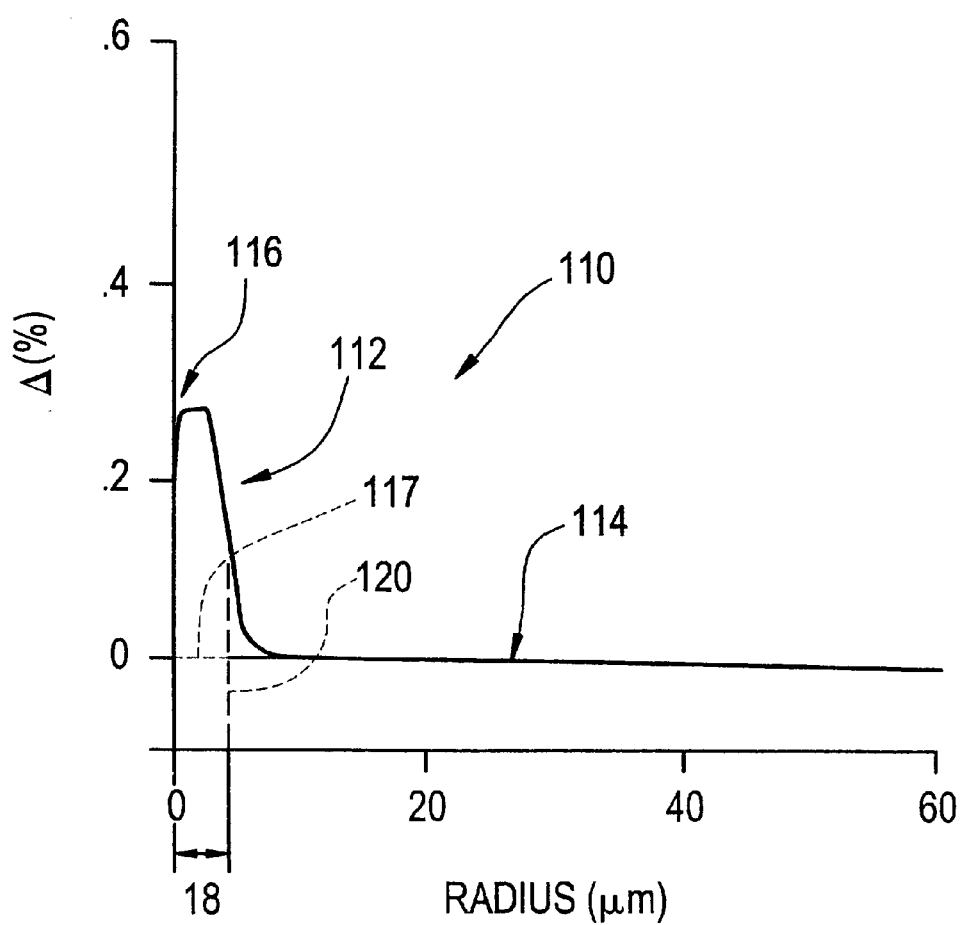
FIG. 10 is a refractive index profile corresponding to another preferred embodiment of an optical waveguide fiber in accordance with the present invention.

FIG. 10 shows the refractive index profile of another preferred embodiment of an optical waveguide fiber as disclosed herein. Core 112 has a maximum relative index $\Delta_1\%$ of about 0.27%, thus, relative to the $\Delta_1\%=0$ of the clad layer 114, the magnitude is about 0.27%. Dashed vertical line 120 depends from the half-peak height 117, i.e. the 0.135% point, which is half of the maximum magnitude of $\Delta_1\%$, at a radius 18 of about 5.57 $\mu$m.

In one aspect, the present invention relates to an optical signal transmission system. The optical signal transmission system preferably comprises a transmitter, a receiver, and an optical transmission line. The optical transmission line is optically coupled to the transmitter and receiver. The optical transmission line preferably comprises at least one optical fiber section having a core and a clad layer which define a step-index profile that provides an effective area greater than about 90 $\mu m^2$, wherein the fiber exhibits an attenuation at 1383 nm which is not more than 0.1 dB/km higher than its attenuation at 1310 nm. In a preferred embodiment, the optical fiber section has a refractive index profile as depicted in FIG. 1. Preferably, the core contains germania. The fiber section preferably contains substantially no fluorine. The fiber section preferably exhibits a total dispersion within the range of about 16 ps/nm-km to about 22 ps/nm-km at a wavelength of about 1560 nm. The fiber section preferably exhibits a PMD of less than about 0.1 ps/km$^{1/2}$.

The system preferably further comprises at least one amplifier, such as a Raman amplifier, optically coupled to the optical fiber section.

The system may further preferably comprise a multiplexer for interconnecting a plurality of channels capable of carrying optical signals onto the optical transmission line, wherein at least one of the optical signals propagates at a wavelength between about 1300 nm and 1625 nm. In a preferred embodiment, at least one of the optical signals propagates at a wavelength between about 1330 nm and 1480 nm.

In a preferred embodiment, the system is capable of operating in a coarse wavelength division multiplex mode.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical waveguide fiber comprising:
   a core having a refractive index profile defined by a radius and a relative refractive index percent, wherein the core contains germania, and wherein the core has an alpha less than about 14; and
   a clad layer surrounding and in contact with the core and having a refractive index profile defined by a radius and a relative refractive index percent;
   wherein the core and the clad layer provide an effective area greater than about 90 $\mu m^2$ at 1550 nm; and
   wherein the fiber contains substantially no fluorine.

2. The optical waveguide fiber of claim 1 wherein the core and the clad layer provide an effective area at 1550 nm of between about 90 $\mu m^2$ and about 115 $\mu m^2$.

3. The optical waveguide fiber of claim 1 wherein the core and the clad layer provide an effective area of between about 95 $\mu m^2$ and about 110 $\mu m^2$.

4. The optical waveguide fiber of claim 1 wherein the core and the cladding define a single core segment.

5. The optical waveguide fiber of claim 1 wherein the relative refractive index of the core is within the range of from about 0.20% to about 0.35%.

6. The optical waveguide fiber of claim 1 wherein the relative refractive index of the core is within the range of from about 0.24% to about 0.33%.

7. The optical waveguide fiber of claim 1 wherein the radius of the core is within the range of from about 4.0 $\mu m$ to about 7.0 $\mu m$.

8. The optical waveguide fiber of claim 1 wherein the radius of the core is within the range of from about 4.5 $\mu m$ to about 6.5 $\mu m$.

9. The optical waveguide fiber of claim 1 wherein the core has an alpha greater than about 5 and less than about 14.

10. The optical waveguide fiber of claim 1 wherein the core has an alpha between about 7 and about 14.

11. The optical waveguide fiber of claim 1 wherein the fiber has a cabled cutoff wavelength of less than or equal to about 1500 nm.

12. The optical waveguide fiber of claim 11 wherein the fiber has a cabled cutoff wavelength of between about 1200 nm and about 1500 nm, and wherein the fiber exhibits macrobending loss less than about 5 dB/m in a 20 mm, 5 turn test, and wherein the fiber exhibits microbending loss of less than about 3.0 dB/m.

13. The optical waveguide fiber of claim 1 wherein the fiber has a cabled cutoff wavelength of less than about 1400 nm.

14. The optical waveguide fiber of claim 11 wherein the fiber has a cabled cutoff wavelength of between about 1300 nm and about 1375 nm, and wherein the fiber exhibits macrobending loss less than about 15 dB/m in a 20 mm, 5 turn test, and wherein the fiber exhibits microbending loss of less than about 3.0 dB/m.

15. The optical waveguide fiber of claim 1 wherein the fiber exhibits macrobending loss less than about 10 dB/m in a 20 mm, 5 turn test.

16. The optical waveguide fiber of claim 1 wherein the fiber further comprises a primary coating surrounding the clad layer and a secondary coating surrounding the primary coating, wherein the primary coating has a modulus of elasticity of less than about 5 MPa.

17. The optical waveguide fiber of claim 16 wherein the secondary coating has a modulus of elasticity of greater than about 700 MPa.

18. The optical waveguide fiber of claim 1 wherein said fiber exhibits microbending loss of less than about 1.0 dB/m.

19. The optical waveguide fiber of claim 1 wherein the attenuation of the optical fiber at 1383 nm is not more than 0.1 dB/km higher than its attenuation at 1310 nm.

20. The optical waveguide fiber of claim 1 wherein the attenuation of the optical fiber at 1383 nm is not more than 0.05 dB/km higher than its attenuation at 1310 nm.

21. The optical waveguide fiber of claim 1 wherein the attenuation of the optical fiber at 1383 nm is not more than 0.01 dB/km higher than its attenuation at 1310 nm.

22. The optical waveguide fiber of claim 1 wherein the attenuation of the optical fiber at 1383 nm is less than or about equal to than its attenuation at 1310 nm.

23. The optical waveguide fiber of claim 1 wherein said fiber exhibits a PMD of less than about 0.05 ps/km$^{1/2}$.

24. The optical waveguide fiber of claim 1 wherein said fiber exhibits a PMD of less than about 0.01 ps/km$^{1/2}$.

25. The optical waveguide fiber of claim 1 wherein the fiber exhibits an attenuation at a wavelength of about 1550 nm of less than or equal to about 0.2 dB/km.

26. The optical waveguide fiber of claim 1 wherein the fiber exhibits an attenuation at a wavelength of about 1550 nm of less than about 0.185 dB/km.

27. The optical waveguide fiber of claim 1 wherein the fiber exhibits a total dispersion within the range of about 16 ps/nm-km to about 22 ps/nm-km at a wavelength of about 1560 nm.

28. An optical waveguide fiber comprising:
   a core having a refractive index profile defined by a radius and a relative refractive index percent with an alpha between about 5 and 14, wherein the core contains germania and wherein the relative refractive index of the core is within the range of about 0.20% to about 0.35% and the radius of the core is within the range of from about 4.0 $\mu m$ to about 7.0 $\mu m$; and
   a clad layer surrounding and in contact with the core and having a refractive index profile defined by a radius and a relative refractive index percent;
   wherein the fiber contains substantially no fluorine.

29. The optical waveguide fiber of claim 27 wherein the relative refractive index of the core is within the range of from about 0.24% to about 0.33%.

30. The optical waveguide fiber of claim 27 wherein the radius of the core is within the range of from about 4.5 $\mu m$ to about 6.5 $\mu m$.

31. The optical waveguide fiber of claim 27 wherein the core has an alpha between about 7 and about 14.

32. The optical waveguide fiber of claim 28 wherein the core and the cladding define a single core segment.

33. The optical waveguide fiber of claim 28 wherein the fiber further comprises a primary coating surrounding the clad layer, and a secondary coating surrounding the primary coating.

34. The optical waveguide fiber of claim 33 wherein the primary coating has a modulus of elasticity of less than about 5 MPa.

35. The optical waveguide fiber of claim 33 wherein the secondary coating has a modulus of elasticity of greater than about 700 MPa.

36. The optical waveguide fiber of claim 28 wherein the attenuation of the optical fiber at 1383 nm is not more than 0.1 dB/km higher than its attenuation at 1310 nm.

37. The optical waveguide fiber of claim 28 wherein the attenuation of the optical fiber at 1383 nm is not more than 0.05 dB/kmn higher than its attenuation at 1310 nm.

38. The optical waveguide fiber of claim 28 wherein the attenuation of the optical fiber at 1383 nm is not more than 0.01 dB/km higher than its attenuation at 1310 nm.

39. The optical waveguide fiber of claim 28 wherein the attenuation of the optical fiber at 1383 nm is less than or about equal to than its attenuation at 1310 nm.

40. The optical waveguide fiber of claim 28 wherein said fiber exhibits a PMD of less than about 0.05 ps/km$^{1/2}$.

41. The optical waveguide fiber of claim 28 wherein said fiber exhibits a PMD of less than about 0.01 ps/km$^{1/2}$.

42. The optical waveguide fiber of claim 28 wherein the fiber exhibits macrobending loss less than about 15 dB/m in a 20 mm, 5 turn test.

43. The optical waveguide fiber of claim 28 wherein said fiber exhibits microbending loss of less than about 1.0 dB/m.

44. An optical waveguide fiber comprising:
  a core having a refractive index profile defined by a radius and a relative refractive index percent, wherein the core contains germania, and wherein the core has an alpha between about 7 and 14; and
  a clad layer surrounding and in contact with the core and having a refractive index profile defined by a radius and a relative refractive index percent;
  wherein the core and the clad layer provide an effective area greater than about 90 $\mu$m$^2$ at 1550 nm; and
  wherein the fiber exhibits a PMD of less than about 0.05 ps/km$^{1/2}$.

45. The optical waveguide fiber of claim 44 wherein the fiber contains substantially no fluorine.

46. The optical waveguide fiber of claim 44 wherein core and the clad layer provide an effective area of between about 95 $\mu$m$^2$ and about 110 $\mu$m$^2$.

47. The optical waveguide fiber of claim 44 wherein the core and the cladding define a single core segment.

48. The optical waveguide fiber of claim 44 wherein the fiber exhibits macrobending loss less than about 15 dB/m in a 20 mm, 5 turn test.

49. The optical waveguide fiber of claim 44 wherein said fiber exhibits microbending loss of less than about 1.0 dB/m.

50. The optical waveguide fiber of claim 44 wherein the attenuation of the optical fiber at 1383 nm is not more than 0.1 dB/km higher than its attenuation at 1310 nm.

51. An optical waveguide fiber comprising:
  a core having a refractive index profile defined by a radius and a relative refractive index percent, wherein the core contains germania; and
  a clad layer surrounding and in contact with the core and having a refractive index profile defined by a radius and a relative refractive index percent;
  wherein the core and the clad layer provide an effective area greater than about 90 $\mu$m$^2$ at 1550 nm; and
  wherein the attenuation of the optical fiber at 1383 nm is not more than 0.1 dB/km higher than its attenuation at 1310 nm.

52. The optical waveguide fiber of claim 51 wherein the fiber contains substantially no fluorine.

53. The optical waveguide fiber of claim 51 wherein the core and the clad layer provide an effective area of between about 95 $\mu$m$^2$ and about 110 $\mu$m$^2$.

54. The optical waveguide fiber of claim 51 wherein the core and the cladding define a single core segment.

55. The optical waveguide fiber of claim 51 wherein said fiber exhibits microbending loss of less than about 1.0 dB/m.

56. The optical waveguide fiber of claim 51 wherein said fiber exhibits a PMD of less than about 0.05 ps/km$^{1/2}$.

57. The optical waveguide fiber of claim 51 wherein the core has an alpha less than about 14.

58. An optical signal transmission system comprising:
  a transmitter;
  a receiver;
  an optical transmission line optically coupled to the transmitter and receiver, wherein the optical transmission line comprises:
  at least one optical fiber section having a core and a clad layer which define a single core segment that provides an effective area greater than about 90 $\mu$m$^2$ at 1550 nm, wherein the fiber exhibits an attenuation at 1383 nm which is not more than 0.1 dB/km higher than its attenuation at 1310 nm.

59. The system of claim 58 wherein the core contains germania.

60. The system of claim 58 wherein the fiber contains substantially no fluorine.

61. The system of claim 58 wherein the fiber section exhibits a total dispersion within the range of about 16 ps/nm-km to about 22 ps/nm-km at a wavelength of about 1560 nm.

62. The system of claim 58 wherein the fiber section exhibits a PMD of less than about 0.05 ps/km$^{1/2}$.

63. The system of claim 58 further comprising at least one Raman amplifier optically coupled to the optical fiber section.

64. The system of claim 58 further comprising a multiplexer for interconnecting a plurality of channels capable of carrying optical signals onto the optical transmission line, wherein at least one of the optical signals propagates at a wavelength between about 1300 nm and 1625 nm.

65. The system of claim 64 wherein at least one of the optical signals propagates at a wavelength between about 1330 nm and 1480 nm.

66. The system of claim 58 wherein the system is capable of operating in a coarse wavelength division multiplex mode.

67. The system of claim 58 wherein the core and the clad layer provide an effective area of between about 95 $\mu$m$^2$ and about 110 $\mu$m$^2$.

* * * * *

UNITED STATES PATENT AND TRADEMARK OFFICE
CERTIFICATE OF CORRECTION

PATENT NO. : 6,611,647 B2
DATED : August 26, 2003
INVENTOR(S) : Berkey George E. et al.

It is certified that error appears in the above-identified patent and that said Letters Patent is hereby corrected as shown below:

Column 25,
Line 21, "and the clad layer provide an effective area of between about" should be
-- and the clad layer provide an effective area at 1550nm of between about"

Column 26,
Line 39, "29. The optical waveguide fiber of claim 27 wherein the" should be
-- 29. The optical waveguide fiber of claim 28 wherein the --
Line 42, "30. The optical waveguide fiber of claim 27 wherein the" should be
-- 30. The optical waveguide fiber of claim 28 wherein the --
Line 45, "31. The optical waveguide fiber of claim 27 wherein the" should be
-- 31. The optical waveguide fiber of claim 28 wherein the --

Column 27,
Line 4, "40. The optical waveguide fiber of claim 28 wherein s aid" should be
-- 40. The optical waveguide fiber of claim 28 wherein said --

Signed and Sealed this

Twenty-seventh Day of April, 2004

JON W. DUDAS
*Acting Director of the United States Patent and Trademark Office*